United States Patent
Safaei et al.

(10) Patent No.: US 6,997,380 B2
(45) Date of Patent: Feb. 14, 2006

(54) MARKETING ANALYSIS AND PLANNING SYSTEM AND METHOD

(75) Inventors: Aman Safaei, South Pleasantville, NY (US); Wen Rong, Bayside, NY (US); James C. Kennedy, Jr., Roswell, GA (US)

(73) Assignee: Scientific Games Royalty Corporation, Newark, DE (US)

( * ) Notice: Subject to any disclaimer, the term of this patent is extended or adjusted under 35 U.S.C. 154(b) by 280 days.

(21) Appl. No.: 10/625,382

(22) Filed: Jul. 23, 2003

(65) Prior Publication Data

US 2004/0133470 A1 Jul. 8, 2004

Related U.S. Application Data

(60) Provisional application No. 60/397,930, filed on Jul. 23, 2002.

(51) Int. Cl.
 *G06F 7/08* (2006.01)
(52) U.S. Cl. ...................... 235/381; 235/376
(58) Field of Classification Search ........ 235/379–385, 235/376; 705/10; 273/269, 273
 See application file for complete search history.

(56) References Cited

U.S. PATENT DOCUMENTS

| | | | |
|---|---|---|---|
| 4,191,376 A * | 3/1980 | Goldman et al. ........... 273/139 |
| 4,591,162 A * | 5/1986 | Fakhoury .................... 273/303 |
| 5,118,109 A * | 6/1992 | Gumina ...................... 273/139 |
| 5,197,736 A * | 3/1993 | Backus et al. .......... 273/142 R |
| 5,223,698 A | 6/1993 | Kapur |
| 5,324,035 A | 6/1994 | Morris et al. |
| 5,403,999 A | 4/1995 | Entenmann et al. |
| 5,796,932 A | 8/1998 | Fox et al. |
| 6,210,276 B1 | 4/2001 | Mullins |
| 6,267,670 B1 * | 7/2001 | Walker et al. ................. 463/17 |
| 6,277,026 B1 | 8/2001 | Archer |
| 6,381,605 B1 | 4/2002 | Kothuri et al. |
| 6,616,531 B1 | 9/2003 | Mullins |
| 2004/0032084 A1 * | 2/2004 | Higginson .................. 273/269 |

FOREIGN PATENT DOCUMENTS

JP 02001037954 A * 2/2001

OTHER PUBLICATIONS

Robin Peterson and Minjoon Jun, Forecasting sales in wholesale industry, Summer 1999, The Journal of Business Forecasting Methods & Systems.*
Carl Vreeland, The Jantzen method of short-range forecasting, Apr. 1963, Journal of Marketing (pre-1986).*

(Continued)

*Primary Examiner*—Michael G. Lee
*Assistant Examiner*—Kimberly D. Nguyen
(74) *Attorney, Agent, or Firm*—Duane Morris LLP

(57) ABSTRACT

A computer implemented method for processing lottery sales data comprises the steps of causing display of a table on a computer, the table containing data representing lottery game attributes and lottery ticket sales for a plurality of lottery game types; enabling a user of the computer to query the data in the table based on at least one criterion from a predetermined list of criteria; and forecasting sales of a new lottery game based on results of the query.

39 Claims, 22 Drawing Sheets

OTHER PUBLICATIONS

Donald Bowersox et al, Simulated product sales forecasting a model for short-range forecasting and operational decision making, Copy right 1981 by JAI Press Inc., Research in Marketing, vol. 4, pp. 39-68.*

International Search Report for International Application No. PCT/US03/23042, dated Jan. 13, 2004.

International Search Report dated Nov. 30, 2004 for PCT Application No. PCT/US03/28408.

Baker et al, Divid and Conquer, Journal of Business Stragety, Sep. 1999, 8 pp., vol. 20, https://www.dialogclassic.com/main.vmgw, Dec. 1, 2004.

Johnson, Dave, Map Out Your Profits, PC Computing, Feb. 1999, 2 pp., vol. 12, https://www.dialogclassic.com/main.vmgw, Dec. 1, 2004.

Microsoft MapPoint 2000 Delivers New Mapping and Analysis Program, 1998, PR Newswire, 3 pp., https://www.dialogclassic.com/main.vmgw, Dec. 1, 2004.

O'Malley et al., Retailing Applications of Geodemographics: A Preliminary Investigation, 1995, 9pp, https://www.dialogclassic.com/main.vmgw, Dec. 3, 2004.

Marshall, Patrick, Review: MapPoint 2000 Raises the Bar for Desktop Mapping, InfoWorld, 1999, 2 pp., vol. 21, https://www.dialogclassic.com/main.vmgw, Dec. 1, 2004.

Tetzeli, Rick, Mapping for Dollars, Fortune, 1993, 5 pp., vol. 12, https://www.dialogclassic.com/main/vmgw, Dec. 3, 2004.

* cited by examiner

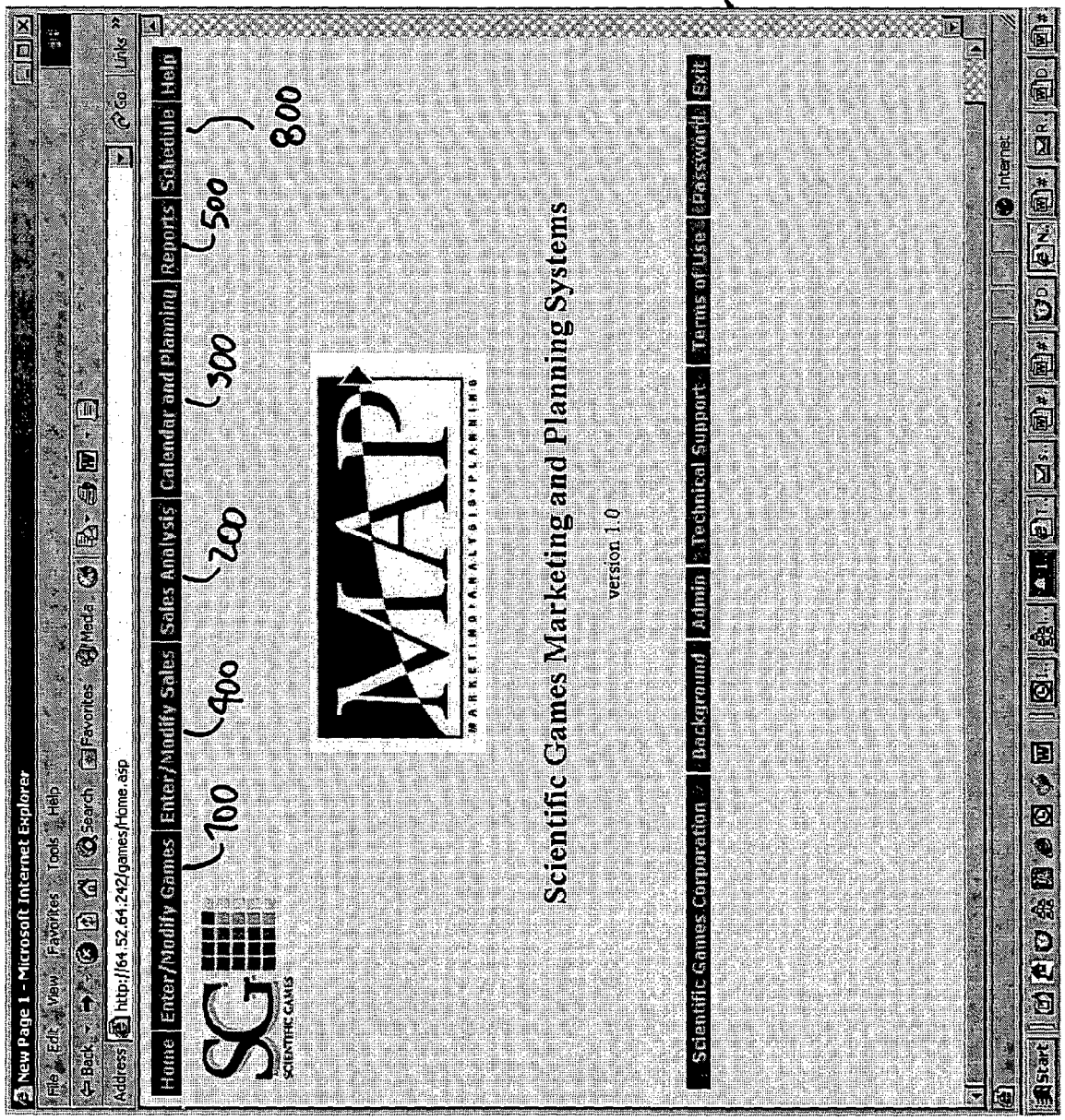

| Image | State | Launch Date | Game Number | Price Point ($) | Quantity (#) | Sold (%) | Cumulative Sales (In $000's) |
|---|---|---|---|---|---|---|---|
| | CO | 10/06/01 | 142 | | 6,124,900 | 79 | 4,818 |
| | CO | 10/27/01 | 144 | | 72,000 | 1144 | 2,470 |
| | CO | 10/27/01 | 150 | | 250,000 | 1116 | 2,791 |
| | CO | 10/27/01 | 151 | | 1,130,340 | 77 | 8,692 |
| | CO | 11/10/01 | 137 | | 99,999,999 | 2 | 1,744 |
| | CO | 12/01/01 | 133 | | 4,762,200 | 11 | 515 |
| | CO | 12/01/01 | 146 | | 99,999,999 | 0 | 372 |
| | CO | 12/21/01 | 149 | | 2,517,000 | 0 | |

Dates: 01/01/2003 – 12/31/2003 (State: IN)
(Price_Point Contains '10')
(Sales in $000's)

| Game # | Game Name | Launch Date | Price ($) | Jan | Feb | Mar | Apr | May | Jun | Jul | Aug | Sep | Oct | Nov | Dec | Total |
|---|---|---|---|---|---|---|---|---|---|---|---|---|---|---|---|---|
| 256 | Two Million Cash | 2/27/1998 | 10 | 522 | | | | | | | | | | | | 522 |
| 440 | Double Millions | 2/11/2000 | 10 | 195 | | | | | | | | | | | | 195 |
| 590 | Bonus Bucks | 7/12/2002 | 10 | 816 | | | | | | | | | | | | 816 |
| 626 | Gold Rush | 1/17/2003 | 10 | 1 | | | | | | | | | | | | 1 |
| Total: | 4 Tickets | | | 1,534 | 0 | 0 | 0 | 0 | 0 | 0 | 0 | 0 | 0 | 0 | 0 | 1,534 |

| Game # | Game Name | Launch Date | Price ($) | Jan 2003 | Feb 2003 | Mar 2003 | Apr 2003 | May 2003 | Jun 2003 | Jul 2003 | Aug 2003 | Sep 2003 | Oct 2003 | Nov 2003 | Dec 2003 | Total |
|---|---|---|---|---|---|---|---|---|---|---|---|---|---|---|---|---|

Summary Of The Prices (01/01/2003 – 12/31/2003)

| Price ($) | % | Total ($) |
|---|---|---|
| 10 | 100 | 1,534,452 |

FIG. 5C

| State | Launch Date | Game Number | Game Name | Price Point ($) | Color | Prints (solo) | Payout (%) | Odds (1 in) | top Prize ($) | Theme | play Style | Feature |
|---|---|---|---|---|---|---|---|---|---|---|---|---|
| IN | 6/13/2003 | 642 | 5 Grand | | purple | solo | 58.49 | 4.87 | 5,000 | money | Match 3 of 9 | |
| IN | 6/13/2003 | 644 | Fast Cash | 2 | red | solo | 64.50 | 4.75 | 10,000 | money | Key Number Match | doubler |
| IN | 6/13/2003 | 645 | Luxor/Pyramid Cash | 7 | black | solo | 72.52 | 3.75 | 70,000 | gaming | multiple games (3) | bonus box |
| IN | 6/13/2003 | 651 | Sapphire Blue 7's | 2 | blue | solo | 64.47 | 4.14 | 15,000 | Numbers | Key Number Match | doubler |
| IN | 5/16/2003 | 639 | Ace In The Hole | | red | solo | 58.50 | 4.8 | 2,500 | gaming (cards) | Yours Beats Theirs | winner take all |
| IN | 5/16/2003 | 640 | Super Blackjack | 2 | blue | solo | 64.50 | 4.31 | 15,000 | gaming (cards) | Yours Beats Theirs | 5 X; 10 X |
| IN | 5/16/2003 | 641 | Mega Bucks | 10 | black | solo | 72.51 | 3.73 | 200,000 | money, wealth | various (4) | |
| IN | 5/16/2003 | 649 | Stairway to Riches | | blue | solo | 58.51 | 4.85 | 1,000 | wealth | Key Number Match | |
| IN | 4/18/2003 | 635 | In Between | | black | solo | 58.49 | 4.59 | 2,000 | gaming (cards) | Yours Beats Theirs | |
| IN | 4/18/2003 | 636 | Lucky 7's | | yellow | solo | 58.49 | 4.64 | 777 | lucky number | Tic Tac Toe | |
| IN | 4/18/2003 | 637 | Aces High | 2 | green | solo | 64.48 | 4.07 | 8,000 | gaming (cards) | Yours Beats Theirs Key | doubler |

MARKETING ANALYSIS AND PLANNING SYSTEM AND METHOD

This application claims the benefit of U.S. Provisional Application No. 60/397,930, filed Jul. 23, 2002.

FIELD OF THE INVENTION

The present invention relates generally to computer networks and the like, and more particularly to systems and methods for enabling lottery administrators to analyze lottery data and plan the release of lottery games, particularly instant lottery games.

BACKGROUND OF THE INVENTION

Lottery sales are an important source of revenue for many states. However, the teachings of the prior art do not provide tools that lottery administrators can use to analyze lottery sales or use the results of the analysis in planning.

SUMMARY OF THE INVENTION

In some embodiments, a computer implemented method for processing lottery sales data comprises the steps of: causing display of a table on a computer, the table containing data representing lottery game attributes and lottery ticket sales for a plurality of lottery game types; enabling a user of the computer to query the data in the table based on at least one criterion from a predetermined list of criteria; and forecasting sales of a new lottery game based on results of the query.

In some embodiments, a computer implemented method for processing lottery sales data comprises the steps of: causing display of a table on a computer, the table containing data representing lottery game attributes and lottery ticket sales for a plurality of lottery game types; enabling a user of the computer to query the data in the table based on at least one criterion from a predetermined list of criteria; and modifying the table to contain values of an index that compares performance of each of the lottery game types that satisfy the query.

In some embodiments, a computer implemented method for processing lottery sales data comprises the steps of: causing display of a table on a computer, the table containing data representing lottery game attributes and lottery ticket sales for a plurality of lottery game types; causing the computer to display a menu for configuring the new game, configuring the new game using game attributes input into the menu by the user; and automatically generating and graphically displaying a schedule for development and launch of the new lottery game.

BRIEF DESCRIPTION OF THE DRAWINGS

The accompanying drawings illustrate preferred embodiments of the invention, as well as other information pertinent to the disclosure, in which:

FIG. 2 shows a home page displayed by the system of FIG. 1

FIGS. 3A–3E show sales analysis displays of the system of FIG. 1.

FIGS. 4A–4D show calendar and planning displays of the system of FIG. 1.

FIGS. 5A–5C show report generating displays of the system of FIG. 1.

FIGS. 7A–7C show game configuration screens for the system of FIG. 1.

FIG. 8A shows a report scheduling display for the system of FIG. 1.

FIGS. 8B and 8C show report spreadsheets generated in response to selection of one of the spreadsheet icons of FIG. 8A.

DETAILED DESCRIPTION

U.S. Provisional Application No. 60/397,930, filed Jul. 23, 2002 is incorporated by reference herein in its entirety.

The Internet is a worldwide system of computer networks—a network of networks in which a user at one computer can obtain information from any other computer and communicate with users of other computers. The most widely used part of the Internet is the World Wide Web (often-abbreviated "WWW" or called "the Web"). One of the most outstanding features of the Web is its use of hypertext, which is a method of cross-referencing. In most Web sites, certain words or phrases appear in text of a different color than the surrounding text. This text is often also underlined. Sometimes, there are buttons, images or portions of images that are "clickable." Using the Web provides access to millions of pages of information. Web "surfing" is done with a Web browser, the most popular of which presently are Netscape Navigator and Microsoft Internet Explorer. The appearance of a particular website may vary slightly depending on the particular browser used. Recent versions of browsers have "plug-ins," which provide animation, virtual reality, sound and music.

Figure 1:
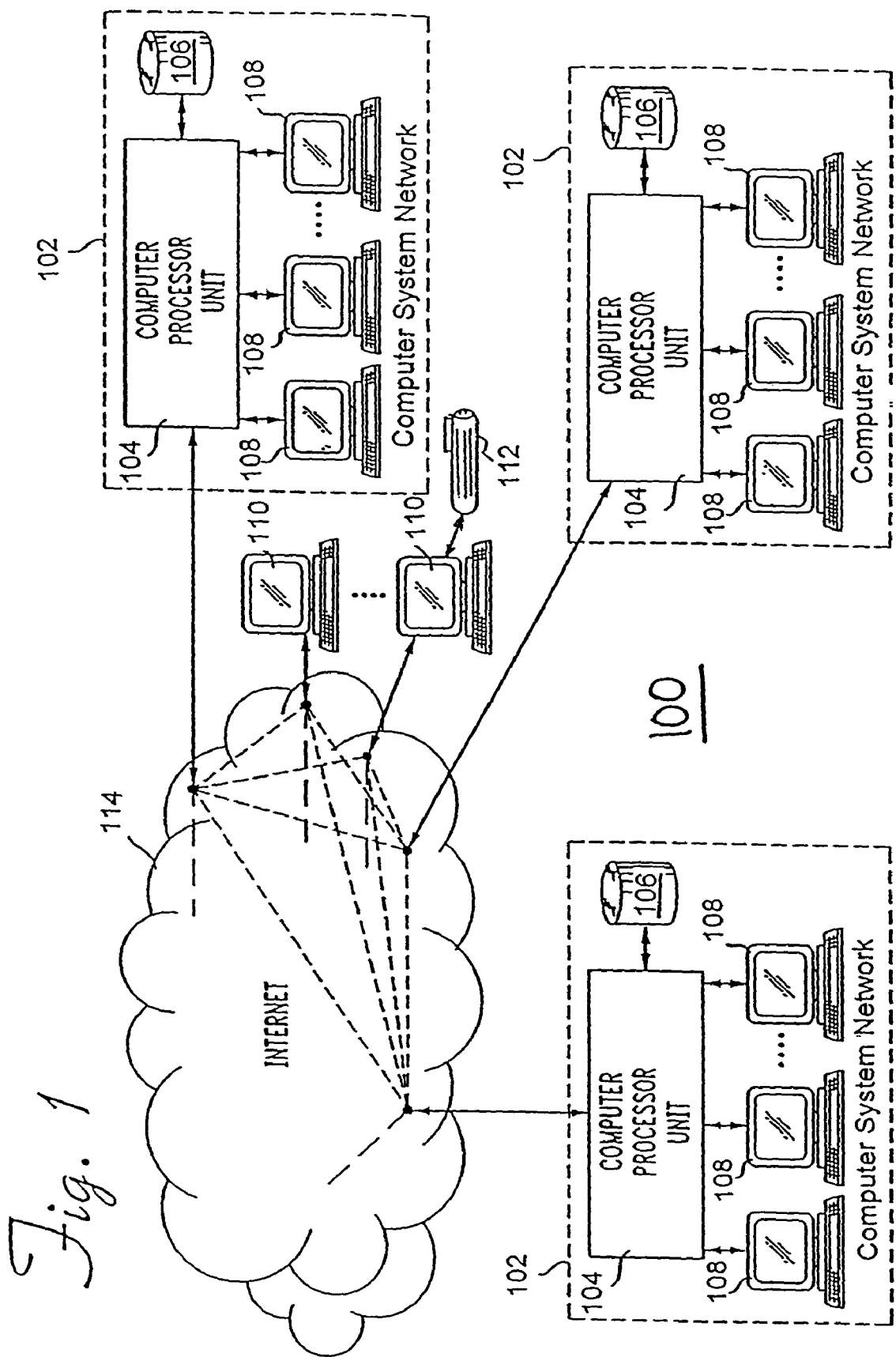
FIG. 1 is a stylized overview of a system of interconnected computer networks.

FIG. 1 shows a system 100 of interconnected computer system networks 102. Each computer system network 102 contains a corresponding local computer processor unit 104, which is coupled to a corresponding local data storage unit 106, and local network user terminals 108. A computer system network 102 may be a local area network (LAN) or part of a wide area network (WAN), for example. The local computer processor units 104 are selectively coupled to a plurality of user devices 110 through Internet 114 described above. Each of the plurality of user devices 110 and local user terminals 108 (collectively, user terminals) may have various devices connected to their local computer systems, such as scanners, barcode readers, printers, finger print scanners, mouse devices, and other interface devices 112.

A user device 110, programmed with a Web browser or other software, locates and selects (such as by clicking with a mouse) a particular Web page, the content of which is located on the local data storage unit 106 of a computer system network 102, in order to access the content of the Web page. The Web page may contain links to other computer systems and other Web pages.

The user device 110 may be a microprocessor-based computer terminal, a pager that can communicate through the Internet using the Internet Protocol (IP), a Kiosk with Internet access, a connected personal digital assistant or PDA (e.g., a PALM device manufactured by Palm, Inc.) or other device capable of interactive network communications, such as an electronic personal planner. User device 110 may also be a wireless device, such as a hand-held unit (e.g., cellular telephone) that connects to and communicates through the Internet using the wireless access protocol (WAP).

The system and method of the present invention may be implemented by utilizing at least a part of the system 100 described above in connection with FIG. 1. It should be apparent to one of ordinary skill that the system may be incorporated in a LAN, in a WAN, or through an Internet 114 based approach, such as through a hosted or non-hosted application service, or through a combination thereof. The functionality of the method may be programmed and executed by at least one computer processor unit 104, with necessary data and graphical interface pages as described hereafter stored in and retrieved from a data storage unit 106. A user can access this functionality using a user device 110 or computer terminal 108.

Described below are a marketing analysis and planning system and method preferably embodied utilizing the network structure described above, i.e., as an application service provided via the Internet. The system and method allow state lottery administrators to easily evaluate sales and marketing data relevant to lottery ticket sales and use that information to plan lottery game releases and forecast lottery game sales. The system and method are described hereafter using various Graphical User Interfaces (GUIs) including Web pages presented to a user. It should be understood that various selectable options presented by the Web pages correspond to functionality provided by a computer processor unit 104 that may be programmed in any number of ways and that this disclosure should not be limited to any particular programming language or methodology. In some embodiments, the system is implemented to include a commercially available off-the-shelf database management system (DBMS) to manage the data, such as, for example, SQL server by Microsoft Corporation of Redmond, Wash., or Oracle9i from Oracle Corporation of Redwood Shores, Calif. or DB2 from IBM Corporation of Armonk, N.Y.

FIG. 2 is an illustration of a graphical user interface (GUI) 130 that allows a lottery administrator user to access the functionality of the system and methods described herein. The user can access the Web page 130 of FIG. 2 through Internet 114 and preferably using a user name and password associated with data available to the user. Lottery data relevant to individual lottery games, such as instant ticket games, for various states are entered and stored in a data storage unit 106 for retrieval and use. Lottery data for each instant lottery game, for example, may include such information as the state administering the game, the game name, the quantity of tickets produced or ordered, the revenue generated by the game, the launch date of the game on a weekly basis, the type of image printed on the ticket, the termination date of the game, the color of the printed ticket, the price of the ticket, the size of the ticket, whether any licensed image is printed on the ticket, the payout of the game, the odds of winning, the top prize amount and number of top prizes, the theme or themes represented by the ticket (e.g., St. Patrick's Day, a casino theme, etc.), the type of game (e.g., match 3), any special game features (e.g., double prize indicator), and sales forecast percentages. This information can then be accessed, parsed, organized and reviewed by a lottery administrator as described below. In one embodiment, a lottery administrator from a particular state only, but not necessarily, has access to information pertinent to that state's lottery games, although the application service provider has access to information provided by all serviced states.

Figure 3A:
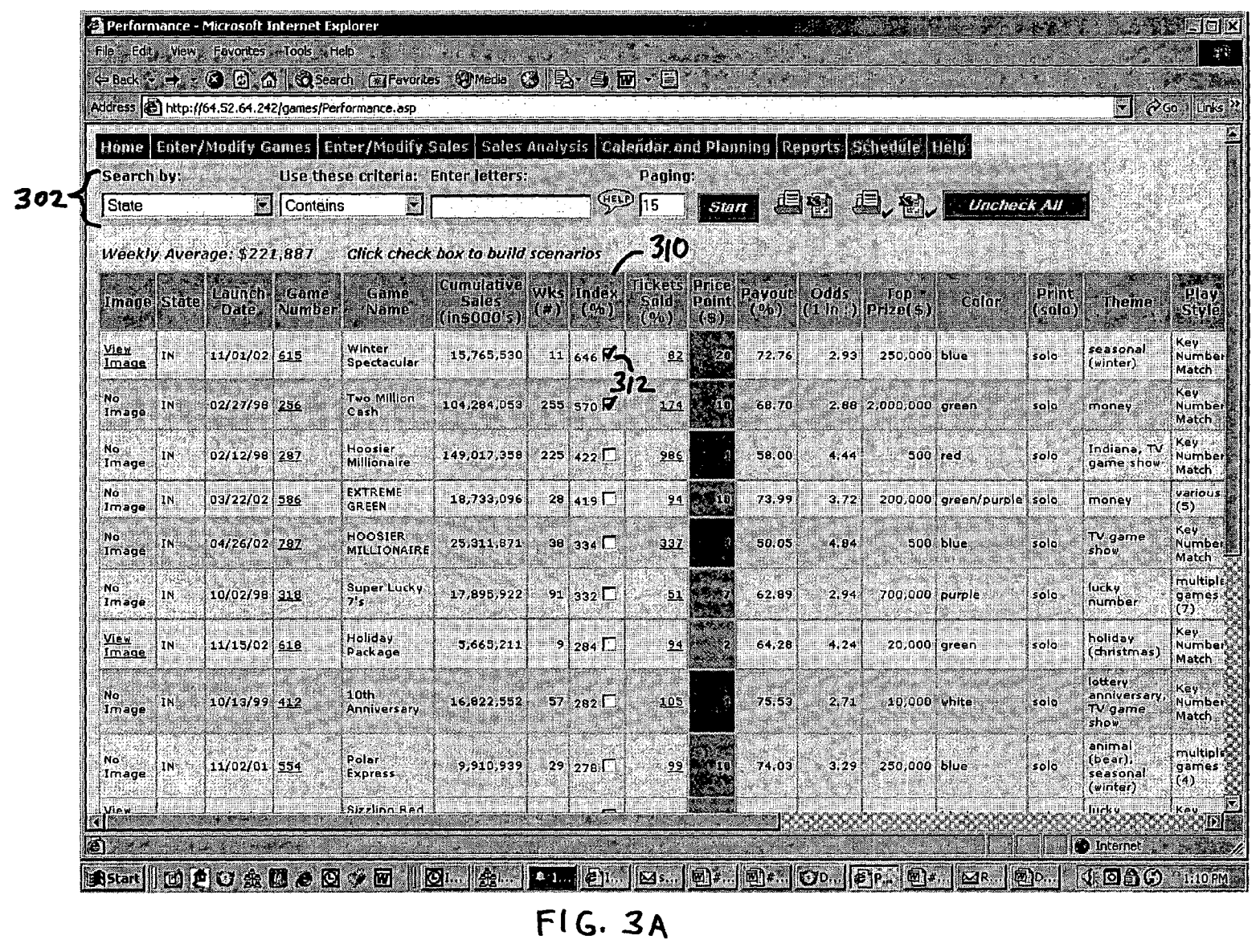
Figure 3B:
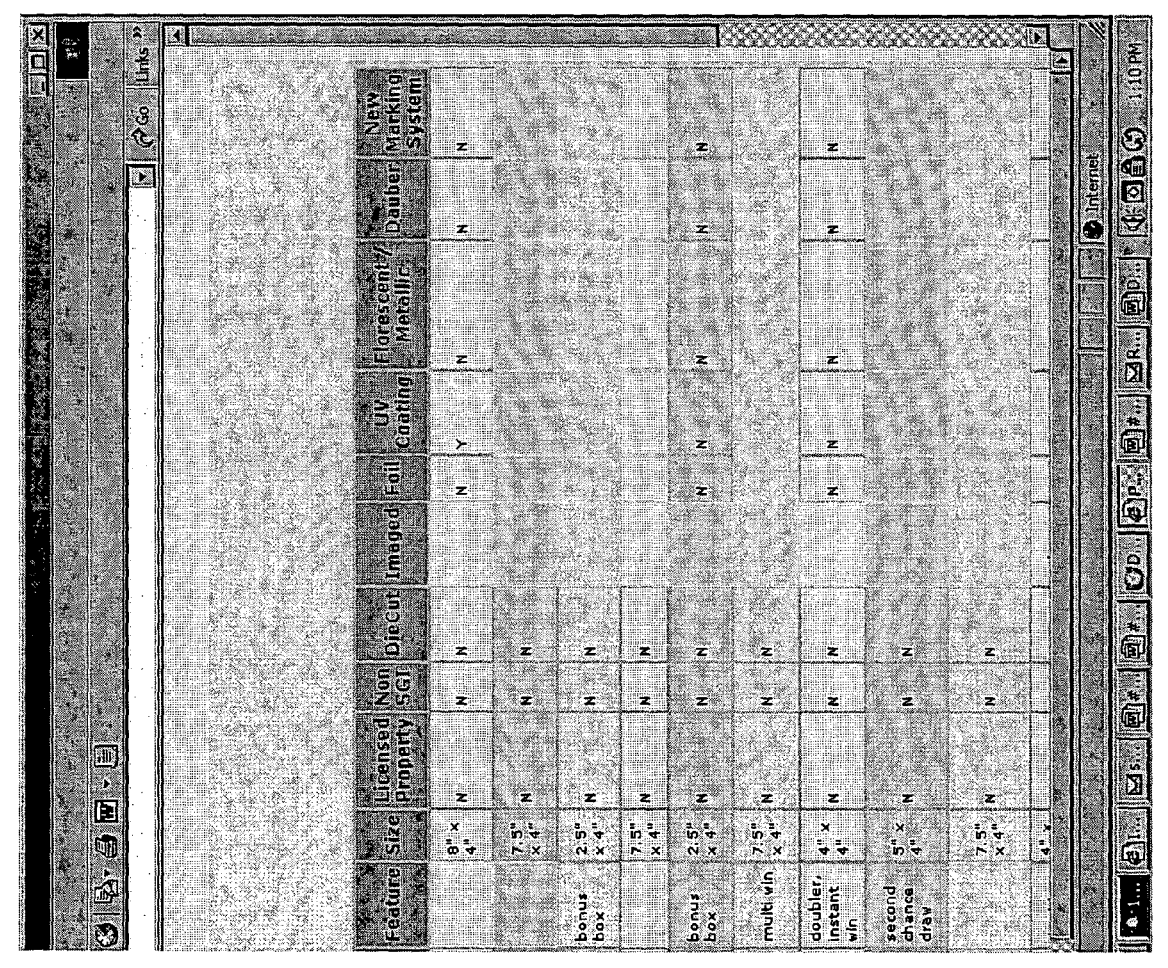

Referring first to the selectable "Sales Analysis" option 200, this option allows the adminstrator to review, parse and organize the lottery data pertinent to that state's (and/or other states') games. FIGS. 3A and 3B illustrate an exemplary search page (FIG. 3B shows the right half of the screen or FIG. 3A, as a result of scrolling right). The page preferably defaults to display a listing of all of the particular state's games (or all state's games if the application service provider accesses the system). Each game is listed with some or all of its relevant lottery data. The list is searchable and reorganizeable in much the same way as the graphical user interfaces described in U.S. Published patent application 2002/0077712 to Safaei et al., entitled "System and Method for Providing Return on Investment Data for Wagers," published Jun. 20, 2002, the entirety of which is hereby incorporated by reference herein. Preferably, the system of capable of including multiple level of sorting (e.g., sorting by up to 10 or 15 attributes).

Referring to the first game shown on the display of FIGS. 3A and 3B, a link to an image of the game ticket (or a thumbnail image of the ticket) is shown, which can be viewed in greater detail if "clicked" on, the state of the game (here, Indiana), the launch date, the game number, the game name, the cumulative sales of the game, the number of weeks the game has been run or was run, the index percentage (a normalized indicator relative to 100 percent indicating how the game performed relative to other lottery games and preferably calculated using the cumulative sales and the number of weeks), the percentage of printed tickets sold, the price of a ticket, the total payout percentage, the winning odds, the top prize, the color of the ticket, the print parameter, theme, play style, special features, ticket size, whether the ticket includes any licensed intellectual property, identification of the vendor, whether the ticket is die cut, whether the ticket is imaged, whether the ticket has foil, whether the ticket has a UV coating, whether the ticket has a florescent or metallic coating, dauber and marking parameters, and any other lottery data.

The print parameter is an indication of the use of special programming parameters used to make the game play unique and conform to the "sprit of the game." For example in a football game, where a player uses football scores on the ticket to determine winners and losers, a print parameter could embody the "sprit of the game" by containing combinations and multiples of sevens and threes that are traditional football scrores.

The imaged parameter is an indicator of special imaging used on the ticket such as colored ink, graphic symbols or any special use of the ink-jet printing used to make the game unique.

The dauber and marking parameters provide an indicator of a mark made on the ticket by the consumer that indicates selection of a particular symbol. The proprietary Colormark and Blue Dauber owned by Scientific Games Corp., or New York, N.Y., are examples. Bingo and Crossword are two examples of games that use dauber and/or marking parameters, but use of these parameters is not limited to these games.

The lottery data are listed in columns that are reorganizeable. For example, selecting the "Cumulative Sales" option by "clicking" on the heading of the column once reorganizes (sorts) the entries (i.e., each game listed) from lowest cumulative sales to highest cumulative sales. Selecting the heading again reverses the order. In this manner, the lottery administrator can view games in a quantitative fashion according to a selected parameter.

Figure 3C:
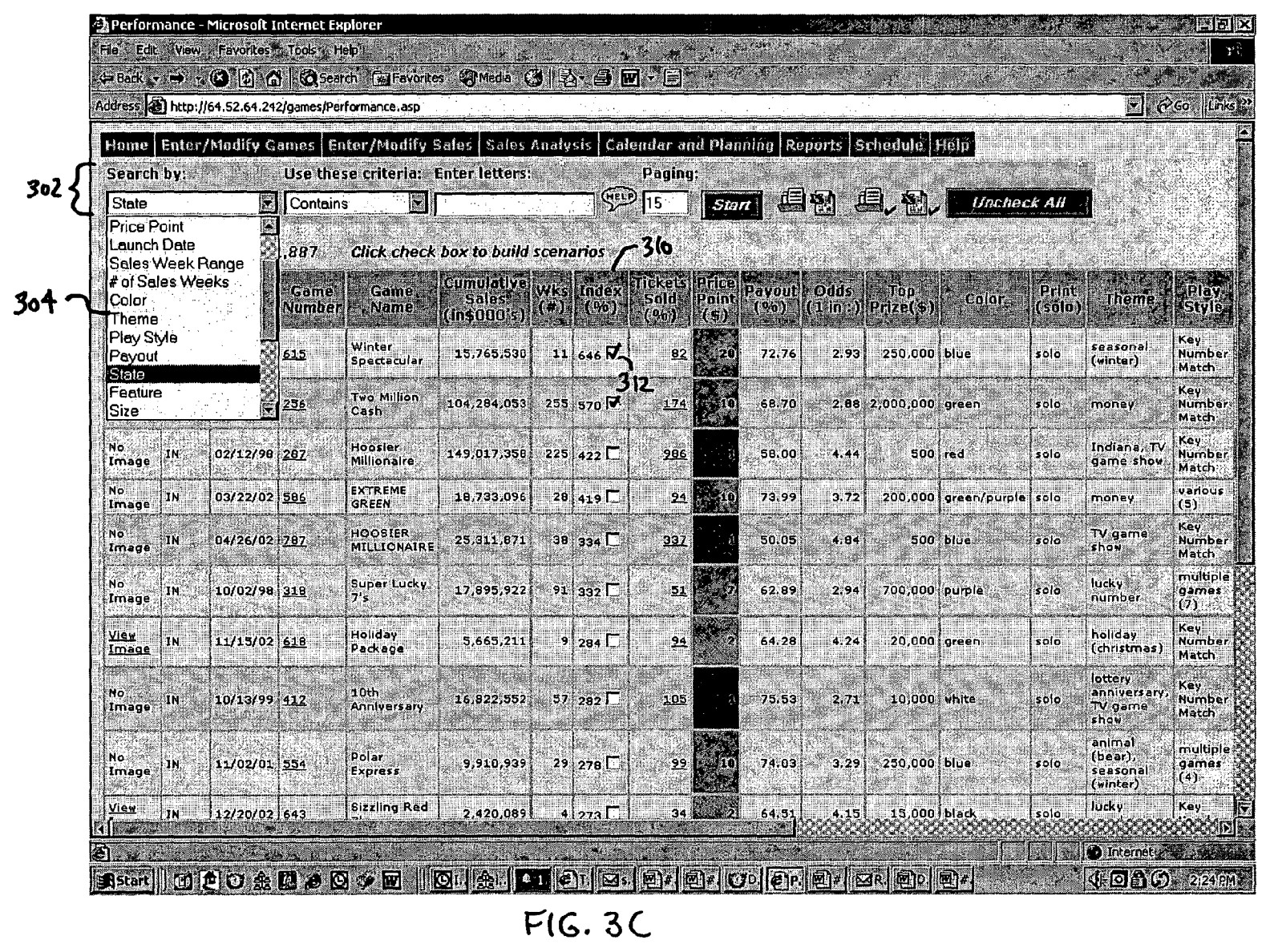
Figure 3D:
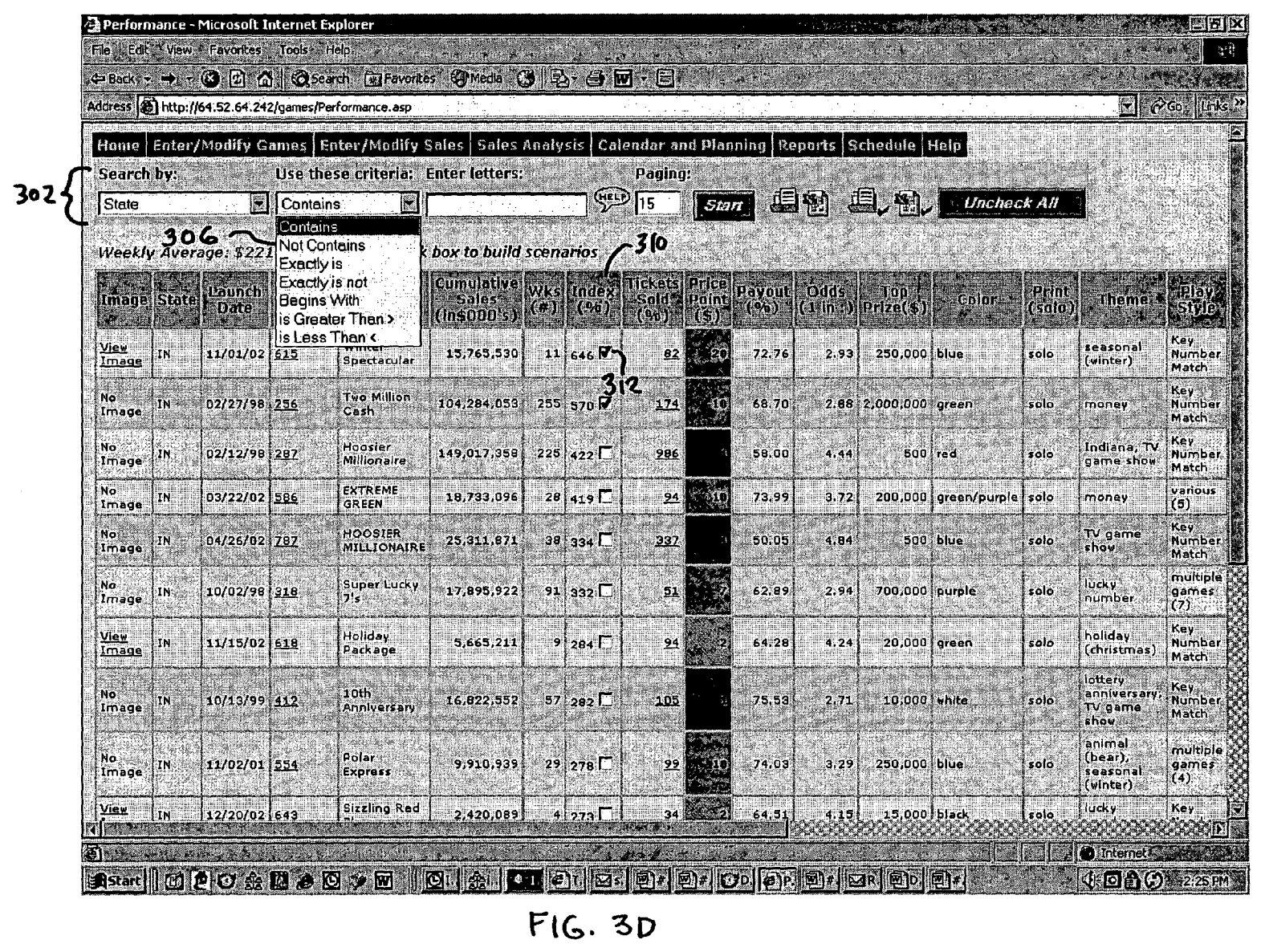
Figure 3E:
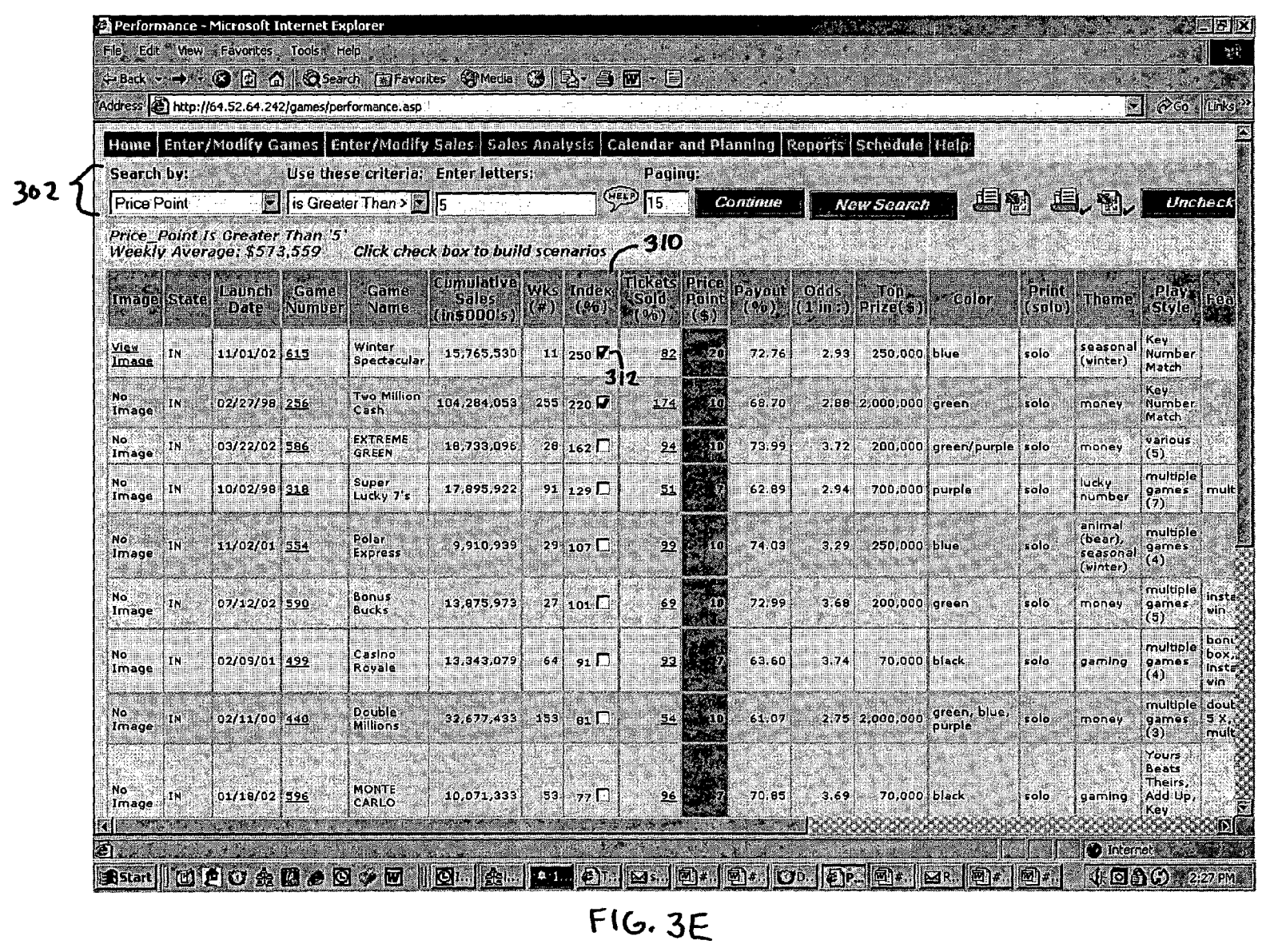

Still further, the GUI 130 includes search features that allow the user to parse and search the data to identify games meeting certain criteria of interest to the administrator. For example, the "Search by" feature 302 can allow the user to search the list by any of the entered lottery data, such as game name, state, launch data, cumulative sales, price, payout, etc. These searcheable features 302 are better illustrated by FIGS. 3C and 3D by the indicated pull-down menus 304, 306. Once a search is selected, the list is regenerated and displayed to the user to show the user the games from the original list that meet the user's search criteria. The search criteria can be further limited by running a second search. FIG. 3E illustrates the results of a search for games having a price greater than $5. FIG. 3E indicates that several lottery games satisfy this search parameter. In preferred embodiments, the user can add more than two search (query) conditions if desired (e.g., 10 or 15 conditions). Incorporation of a DBMS in the system platform facilitates this expanded search capability.

As mentioned, the index percentage ("Index (%)") 310 compares the sales performance of a particular game against the total state sales of lottery games in the system. The index 310 is also dynamically recalculated when the search feature 302 is used, such that the individual games are then compared against the games that satisfy the search criteria. For example, an individual index 310 can be calculated based on the performance of a specific $1 ticket verses the performance of all $1 tickets, rather than all tickets. This provides a convenient means of comparing ticket performance.

Referring again to FIGS. 3A and 3B, selecting the game number of an individual game displays all of the lottery data for the selected game in a single GUI apart from the displayed list. The user, if authorized to do so, can modify the lottery data, such as by modifying sales forecast percentages (i.e., to indicate a percentage increase or decrease in projected sales) or past sales numbers.

A selectable check box 312 is also shown in the "Index (%)" column. After the user searches for and identifies lottery games meeting the user's desired criteria, such as sales forecasts or a particular theme, the user can select the individual game by clicking on the game's check box 312 (as shown, for example, with game numbers 646 and 570). The significance of this selection is described below in connection with the "Calendar and Planning" option 300 of FIG. 2. In this manner, the administrator can make an informed decision as to what game to release and when to release that game based on historical sales data and forecasts.

Figure 4B:
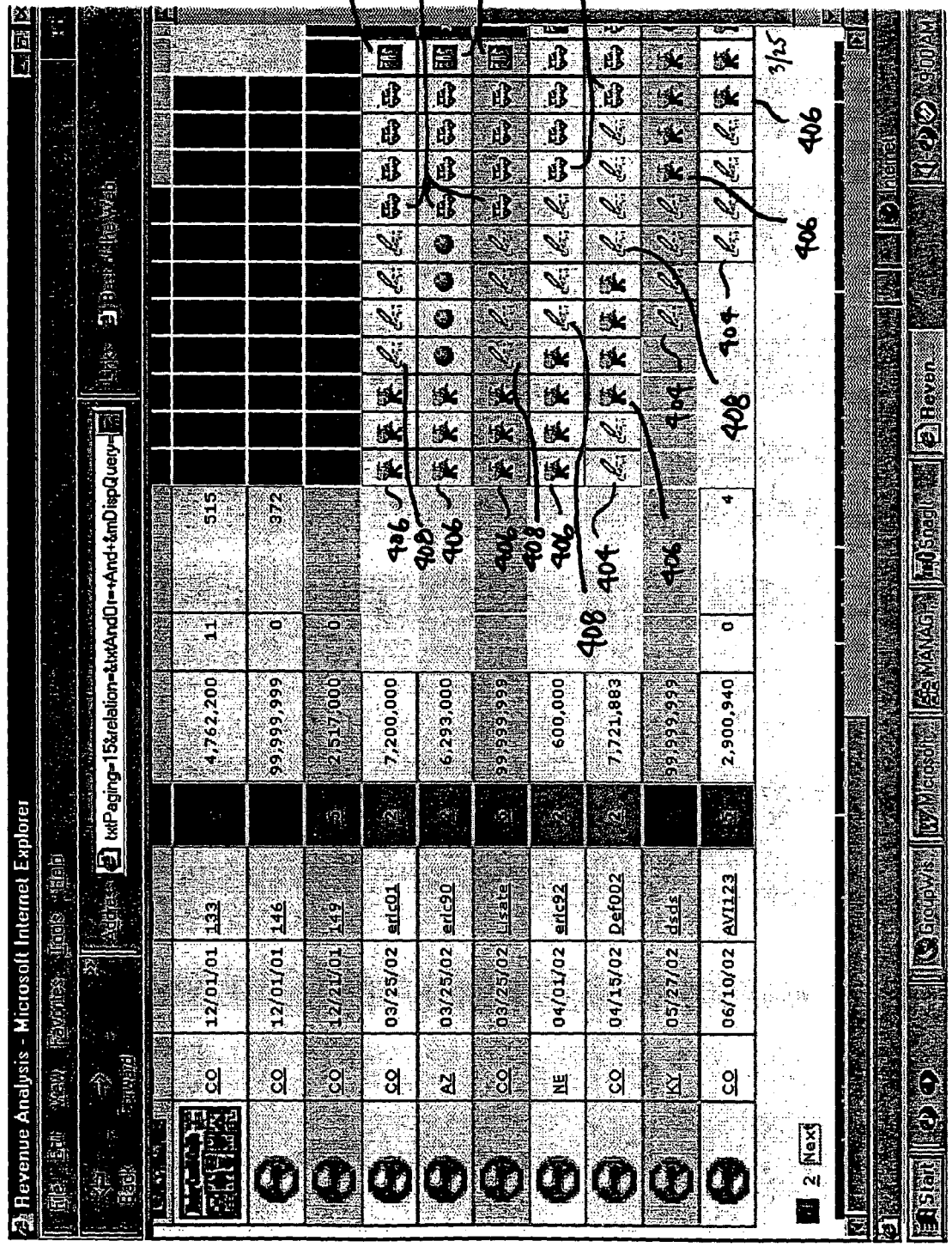
Figure 4C:
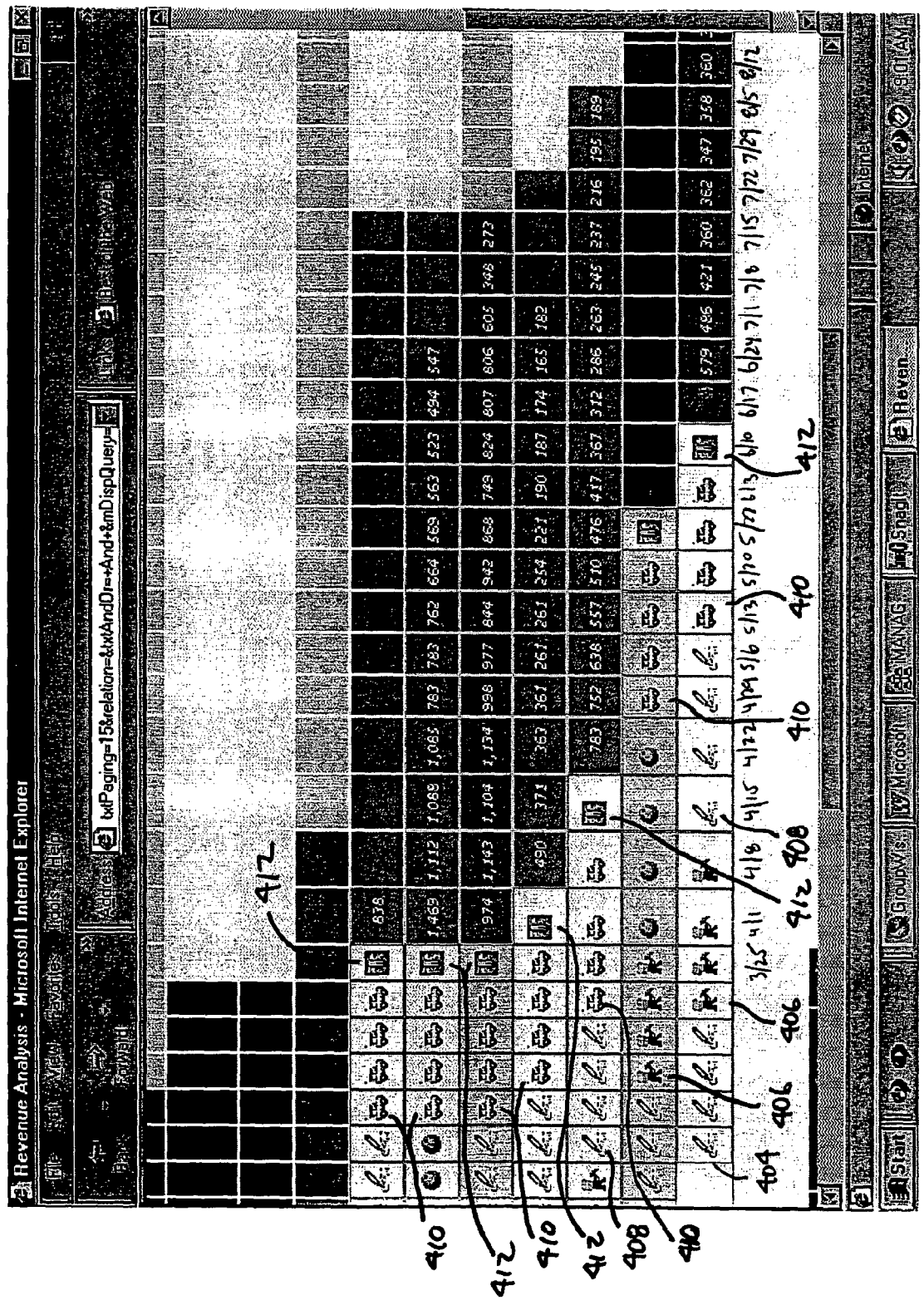

FIGS. 4A–4C show a GUI displayed after selecting the "Calendar and Planning" option 300 of FIG. 2. This GUI, by scrolling down and over, shows all of the games in play over, for example, the last year (or other selected time frame) and that are currently scheduled to be released. A game that has been selected as described above with the GUI of FIGS. 3A and 3B can be added as a game to be released in the future at a selected date simply by scrolling to the desired launch date 402 and clicking the date. This feature automatically adds the selected game to the release schedule and shows a timeline in the GUI, pictorally, of when the design of the ticket must begin (indicated by the leftmost pencil graphics 404 in FIGS. 4B and 4C), when manufacturing should occur (indicated by the worker graphics 406 in FIGS. 4B and 4C), when review (indicated by the right pencil graphics 408 in FIGS. 4B and 4C) and delivery (indicated by the automobile graphics 410 in FIGS. 4B and 4C) should occur and the launch date 412.

In an exemplary embodiment, the dates are normally programmed within the system as global parameters. For example a parameter may be set allow four weeks for the design. In each individual case, the parameters could be changes through a backend administrative facility. (The system administrator sets the values of the global parameters). The date parameter for each state can also be set. So in one state two weeks may be allocated for the design, and in another state, four weeks may be allocated. Generally these are very flexible allowing the production and sales and marketing personnel to set up parameters for their customers.

These particular parameters may be entered into the system based on the specific requirements or needs of the customer or game and retrieved from data storage unit 106. The chart also forecasts the sales of the game based upon the game's sales history as discerned from the lottery data and displays this information on a weekly basis. When offering a ticket in a state, the sales are calculated based on the historical sales of the same or similar ticket in the same state if any. If the offering has no historical sales figures in the state, then the sales from another state may be used and adjusted based on the population. The total sales forecasts for the entire displayed period and per month are also calculated and displayed, as shown in FIGS. 4A–4C. For games that have been completed during the time period or are currently in effect, cumulative sales numbers are shown. Note that FIGS. 4A–4C show partial views in order to account for the ability to scroll through portions of the Web page.

Sales forecasts may be based on past performance of the particular lottery game that has been selected for a future release. If the past sales statistics for a game are derived from sales in, for example, California, but the ticket is selected for printing for an Iowa or other state lottery, the system takes the difference in population numbers into account to adjust the forecasted sales. Population statistics may be retrieved from data storage unit 106. Other data may also be used, such as data indicating percentage of the relevant population that play lotteries in a particular state or other demographic data, such as age and gender statistics and the like.

The GUI shown in FIGS. 4A–4C also provides the user the ability to run if/then scenarios. If the user selects a particular game that is to be released at a future date by selecting the game's name or number, the user is provided the opportunity to modify certain lottery data, such as forecast percentage, game price, game duration, etc. The GUI then displays recalculated forecasts. The lottery administrator can then run different scenarios to determine the best manner of achieving desired sales within the limitation set by state lottery rules.

The GUI of FIGS. 4A–4C is also preferably searchable like the GUI of FIGS. 3A and 3B. This enables the administrator to view calculated sales forecasts per game or games that share selected characteristics. When this feature is used, and a query results in selection of a subset of the data being displayed, only the data for which the query is satisfied are included in the forecast. The Calendar and Planning feature also preferably allows the user to directly order the tickets for a selected lottery game directly through the Web site.

Figure 4D:
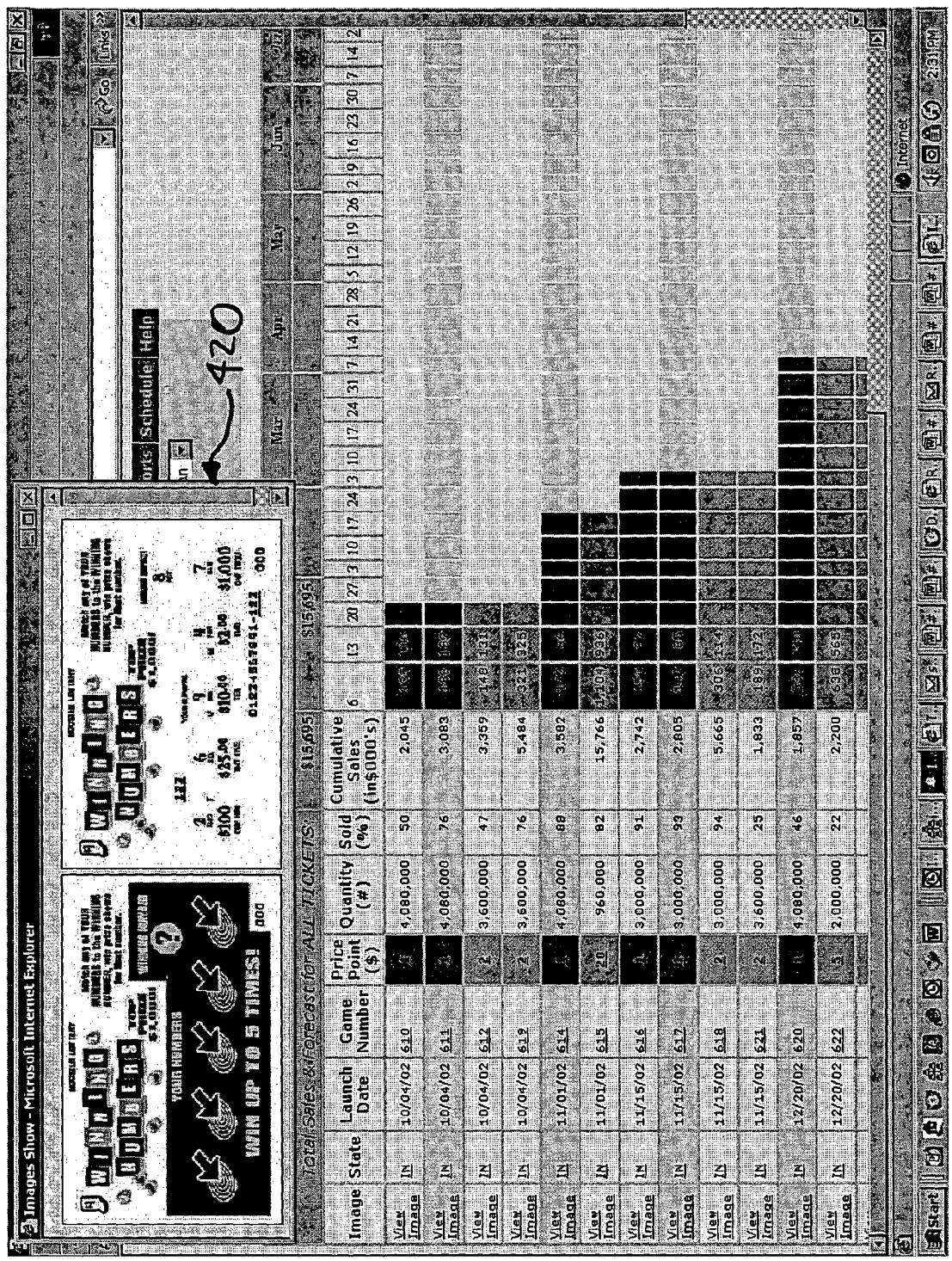

FIG. 4D shows a pop-up screen 420 displayed in response to clicking one of the thumbnails on the pages of FIGS. 4A–4C. This screen displays the images of both sides of a lottery ticket of the game corresponding to the row in which the "view image" link is clicked. FIG. 4D also shows an option in which a hypertext link is displayed in the image column, instead of a thumbnail of the ticket image.

Figure 5A:
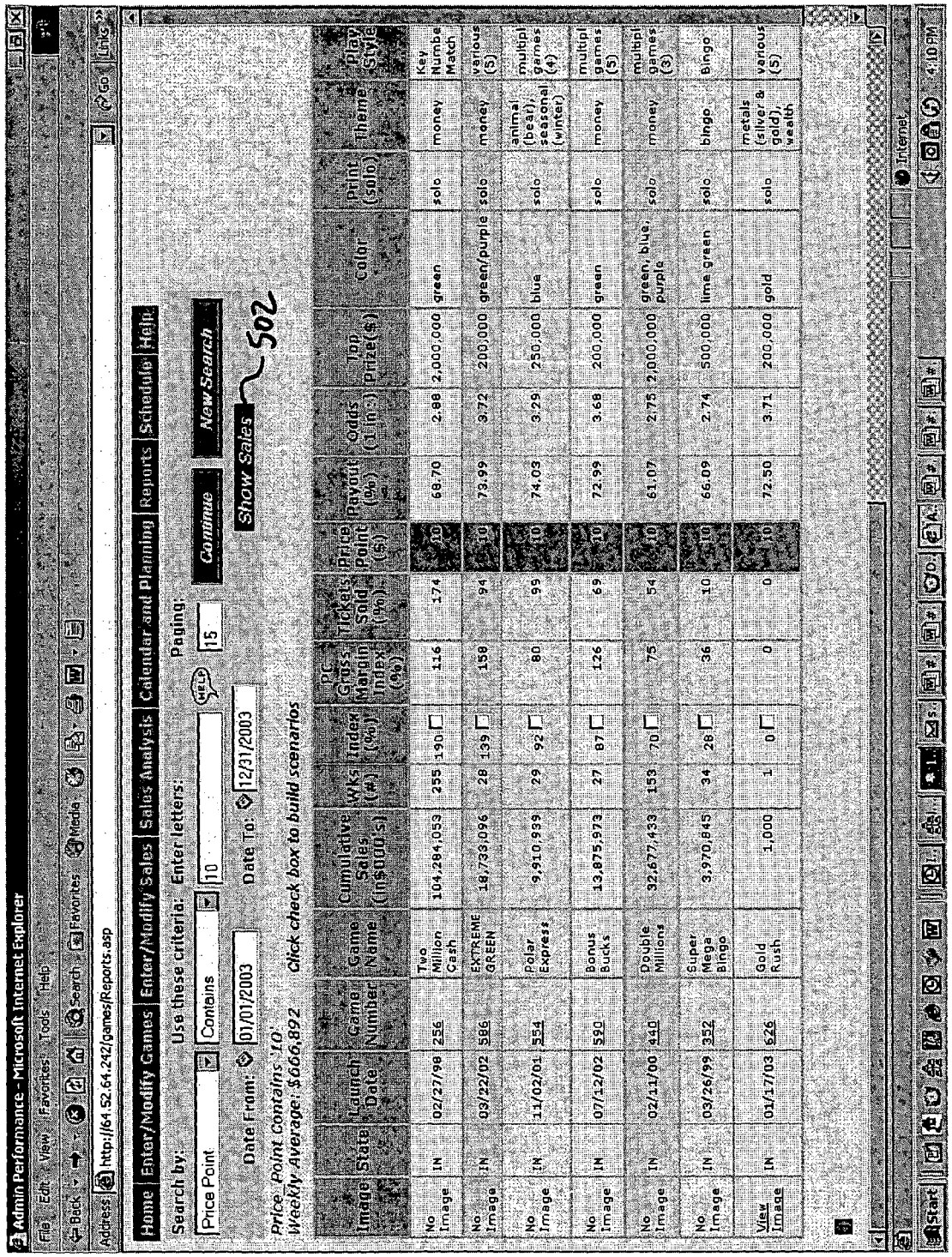
Figure 5B:
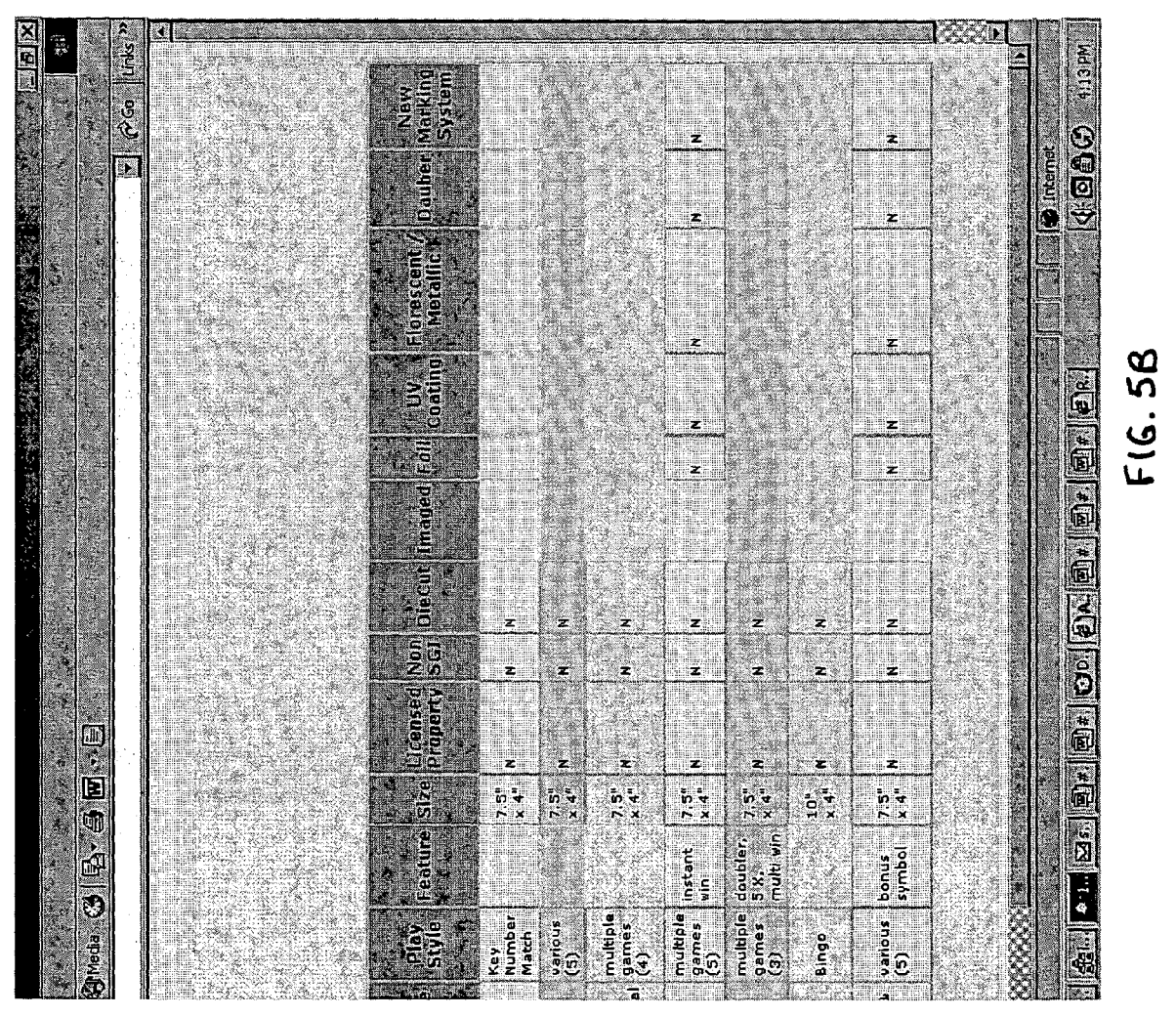

Referring again to FIG. 2, the "Reports" feature 500 provides the user with another searchable page, shown in FIGS. 5A and 5B. (FIG. 5B shows the right side of the display of FIG. 5A, as a result of scrolling right). The user can use the search features as described above to select various games. For example, FIGS. 5A and 5B show a list of current games having a sales price of $10. The user can then select the "show sales" feature 502 and a sales report for those games is displayed to the user, as shown in FIG. 5C. A graphical depiction of the sales information may also be generated and displayed for the user.

Referring again to FIG. 2, the "Enter/Modify Sales" option 400 is now described. This option allows an authorized user to update the actual sales amounts data for a game on, for example, a weekly basis and to correct any sales figures that may have been incorrectly entered.

Figure 6A:
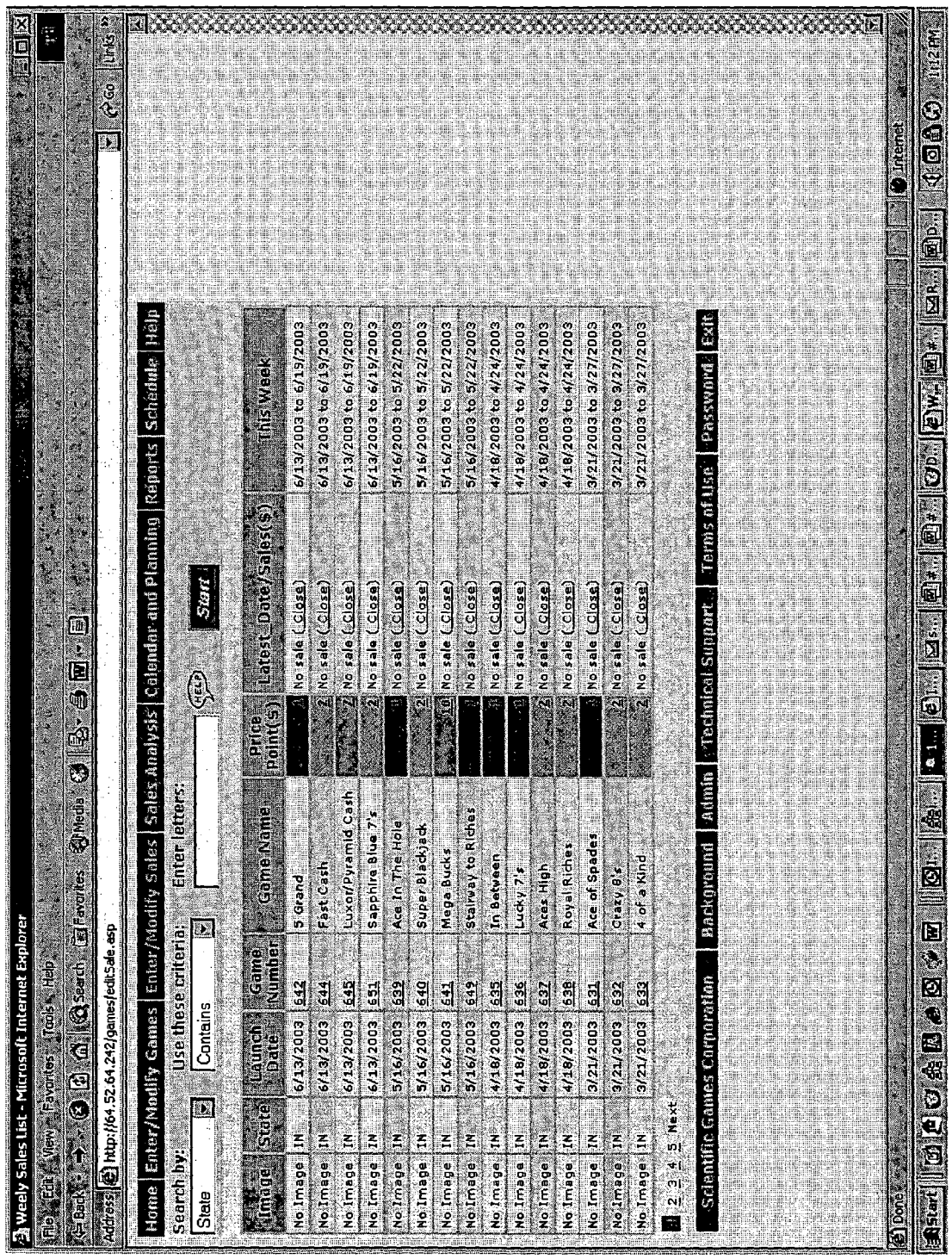
FIGS. 6A and 6B show sales entry and modification displays for the system of FIG. 1.

FIG. 6A shows the page displayed as a result of selecting the "Enter/Modify Sales" option tab 400 from the GUI of FIG. 2. The display includes a table listing games that have been entered into the system. For each game, a row is included displaying the state, launch date, game number, game name, price point, latest date for which sales data have been input, and the current week. In some embodiments, the displayed table can be queried, in the same manner described above with respect to the sales analysis page of FIGS. 3A–3D. In some embodiments, the entries can be sorted by clicking on one of the column headings in the table. The rows are then sorted in ascending or descending order based on the data in that column.

Figure 6B:
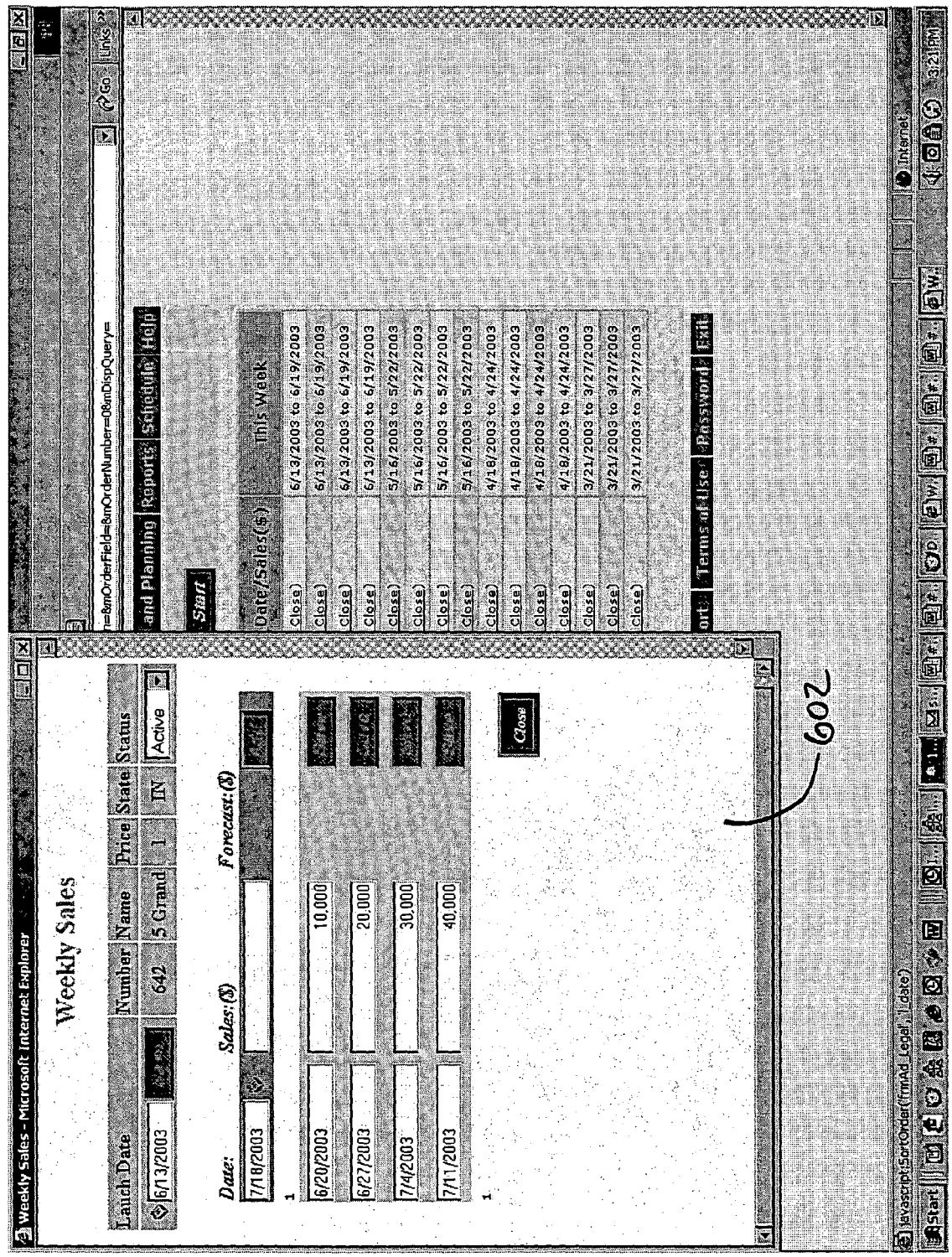

FIG. 6B shows a weekly sales data entry page 602 that pops up in response to selection of one of the game number links in the page of FIG. 6A. The user can enter or modify the launch date, status, and the sales for any given week.

Referring again to FIG. 2, the main input page 130 includes an "enter/modify games" tab 700, selection of which causes display of the interface screen shown in FIG. 7A.

FIG. 7A shows the summary "Enter/modify Games" page displayed in response to selection of the tab 700 in the main menu of FIG. 2. For each game, the table of FIG. 7A contains a row listing the state, launch date, game number, game name, price point, color, print parameter, payout percentage, odds, top prize, theme, play style and feature. In some embodiments, the displayed table can be queried, in the same manner described above with respect to the sales analysis page of FIGS. 3A–3D. In some embodiments, the entries can be sorted by clicking on one of the column headings in the table. The rows are then sorted in ascending or descending order based on the data in that column.

Figure 7B:
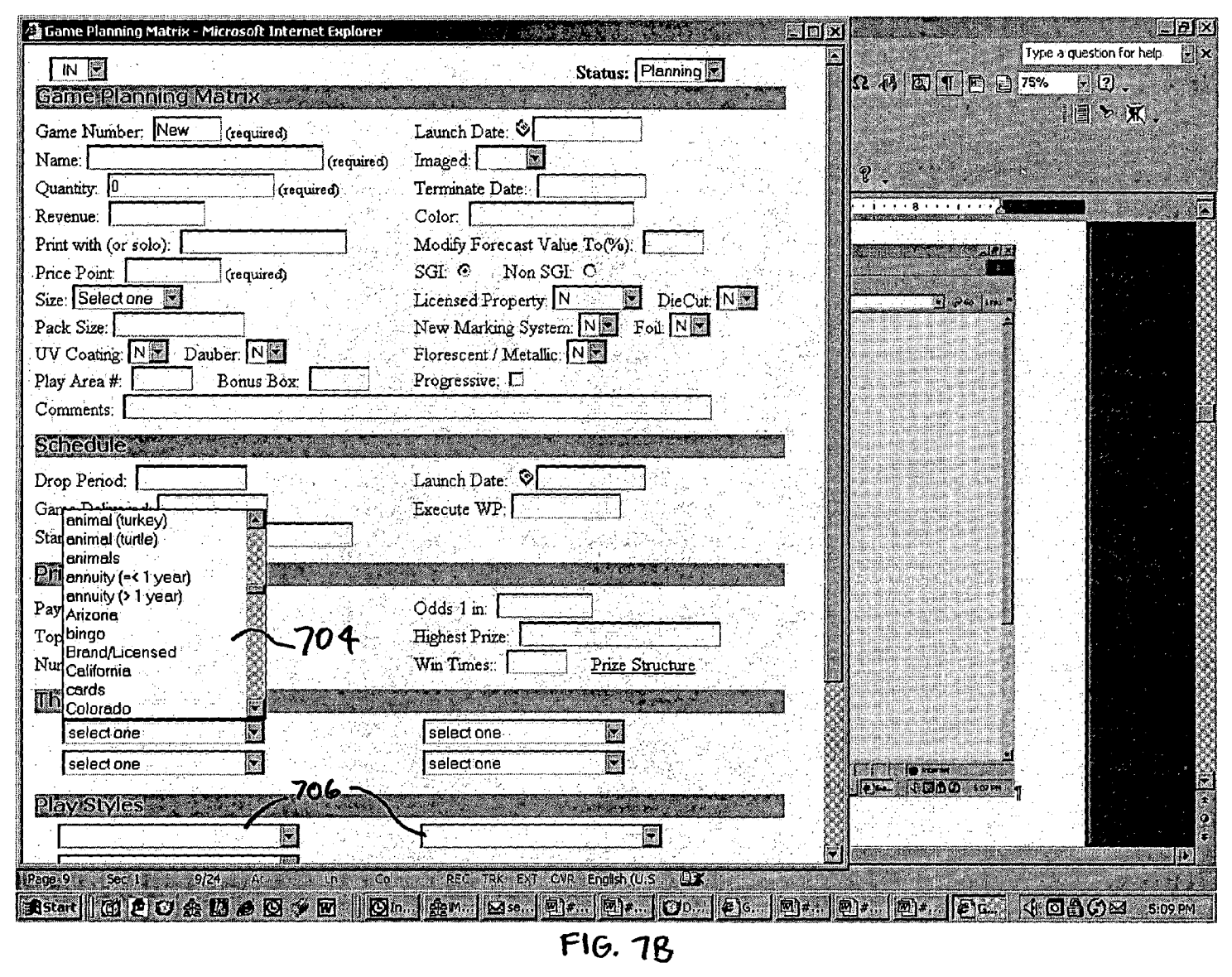
Figure 7C:
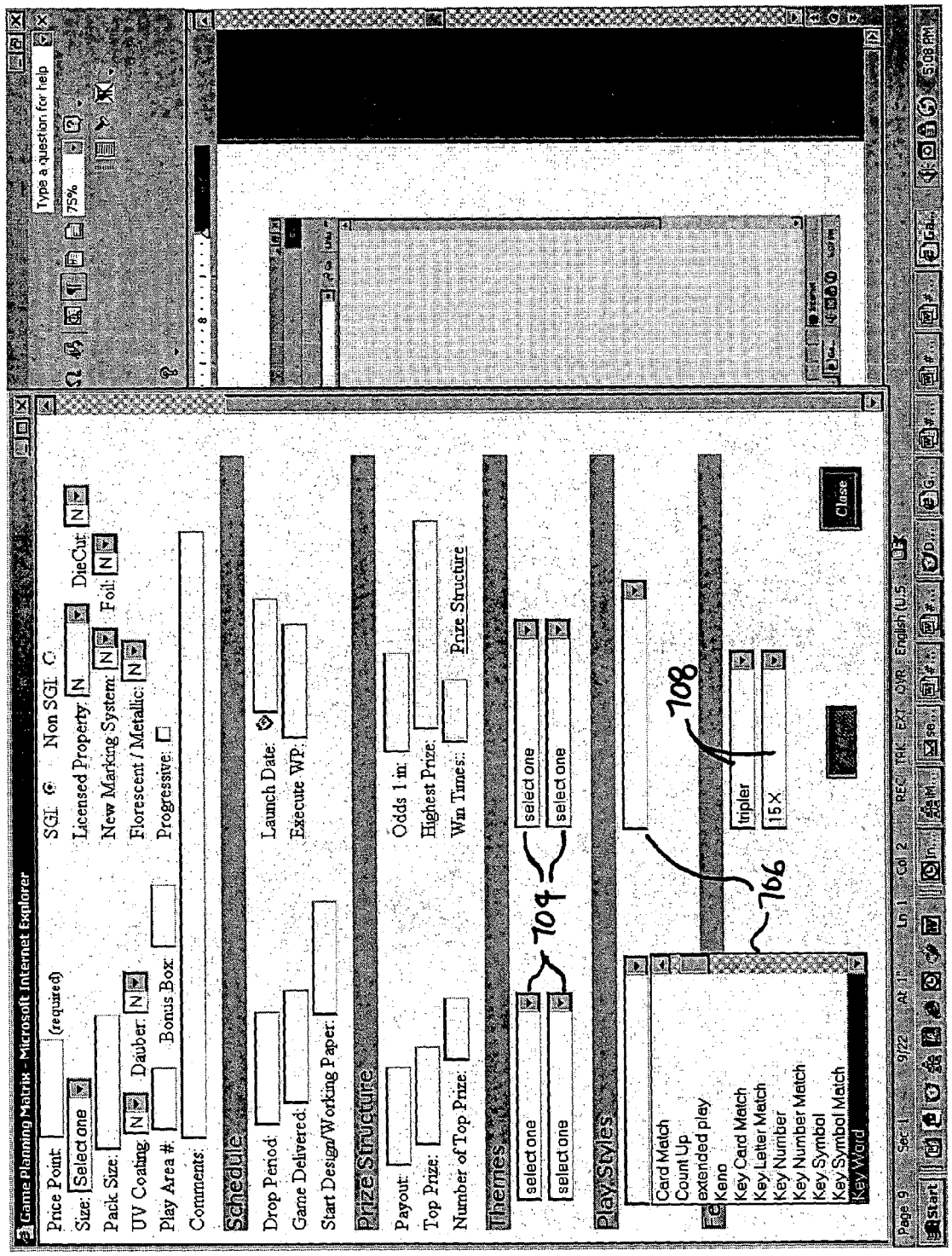
Figure 9C:
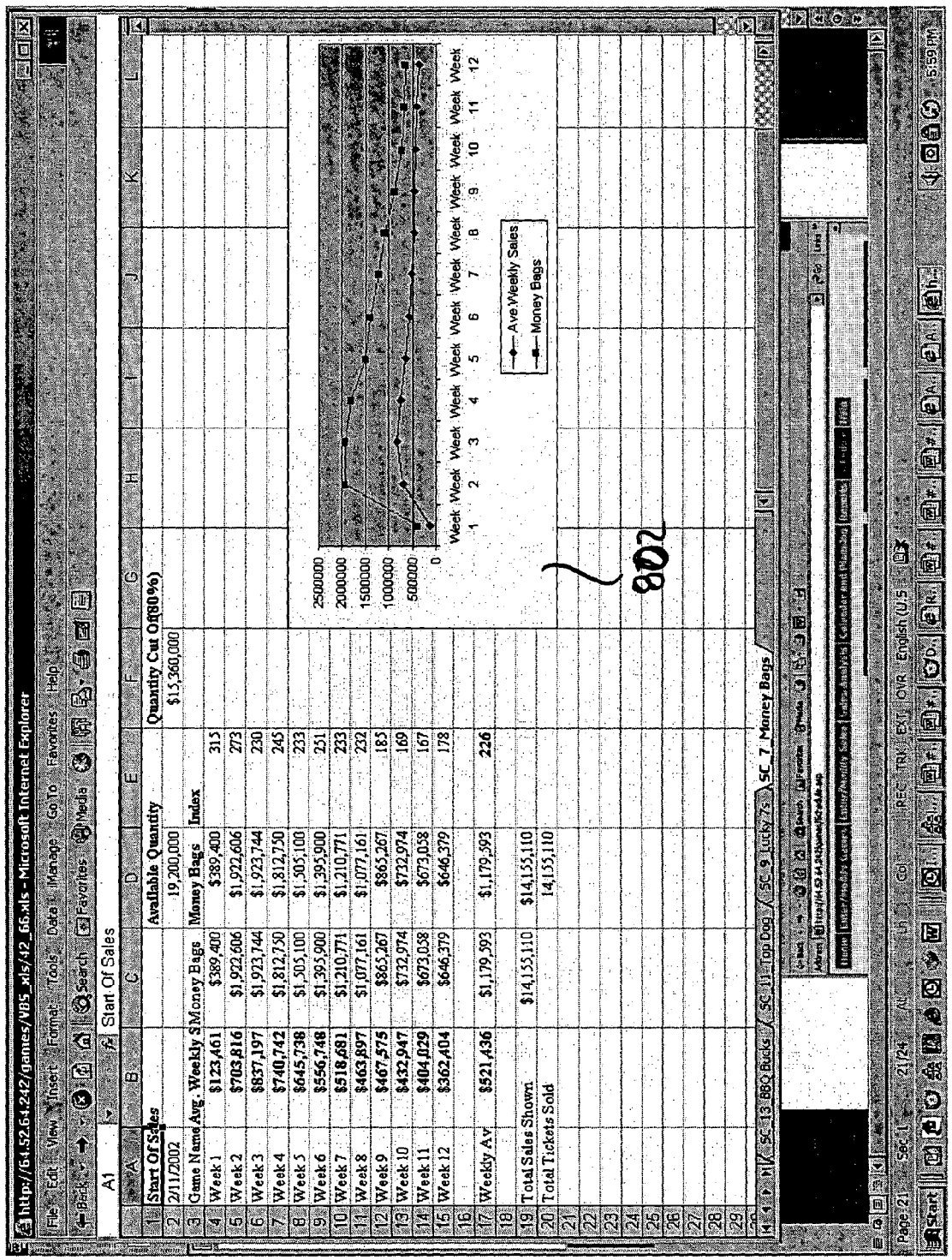

FIGS. 7B–7C show the "game planning matrix" page displayed in response to selection of the "add new game" button for configuring a new game. A similar game planning matrix page is also displayed in response to selection of the game number 702 of an existing game, except that in the case of an existing game, all of the current configuration parameters for that game appear in the matrix when it is displayed.

FIG. 7B shows the top portion of the game planning matrix page. In addition to the fields that are displayed in the table of FIG. 7A, additional parameters may be input, such as details of the ticket configuration, details of the ownership of the intellectual property for the game, and the like. A drop down "theme" menu 704 allows the user to select from a variety of themes, which may include, for example, animals, annuities, states, bingo, cards, food, leisure events, games, nationalities, holidays, merchandise, metals, money, movies, radio, seasons, sports, television, and the like. In the example, up to four themes may be selected.

FIG. 7C shows the bottom portion of the game planning matrix page of FIG. 7B, with the "play styles" drop down list 706 displayed. The styles may include, for example, bingo, keno, lotto, various types of matching, maze, multiple games, poker, games of probability, rummy, solitaire, tic tac toe, yahtzee, and the like. In the example, up to three play styles may be selected.

The bottom portion of the game planning matrix page also includes a "features" drop down list 708 (partially hidden in FIG. 7C). The features in the list may include various multiples, auto win, bonus box, card or symbol, doubler, instant win, multiplier, second chance draw, wild card, wild symbol, winner take all, and the like. In the example, up to four features may be selected.

In the example, the user can select one or more attributes from the themes list, one or more attributes from the play style list, and one or more attributes from the features list. Other embodiments may enable the user to different numbers of attributes from each of these lists. For example, some embodiments may only allow selection of one attribute from each list. Other embodiments may allow selection of more than four attributes from one or more of the lists.

Figure 8A:
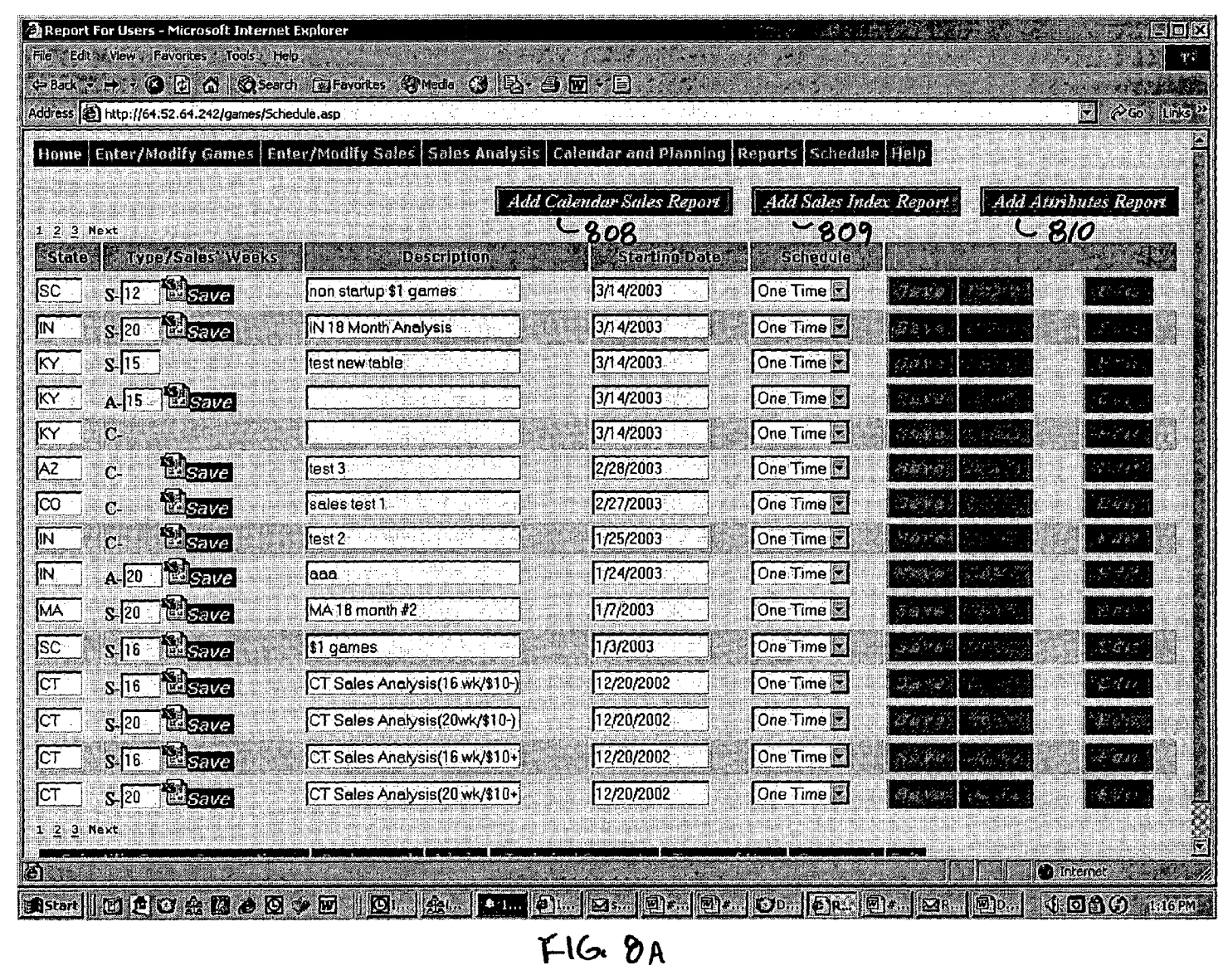

The display of FIG. 2 includes a "schedule" button 800. FIG. 8A shows a report scheduling page displayed in response to selection of the schedule button 800. The scheduling page of FIG. 8A includes a row for each report. The report scheduling page includes, for each report, a row for defining the report schedule. The row for each report includes the state, report format (e.g., Sales Index (S) reports, Attributes (A) reports or Calendar sales (C) reports), number of sales weeks, a text description, a starting date, and the schedule for generating the report.

Figure 8B:
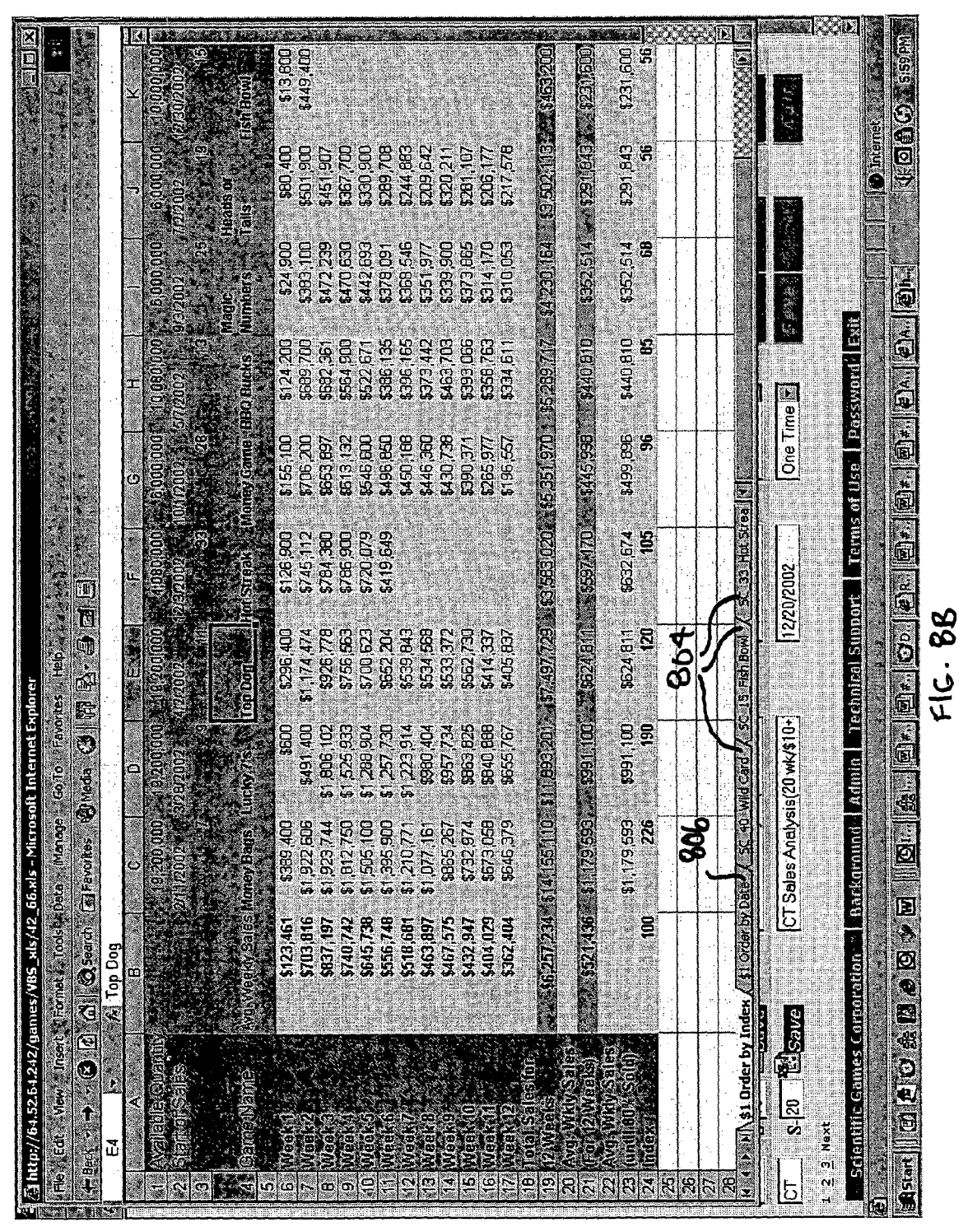

The reports for which data are available include icons for launching a display of a table having the appearance of a spreadsheet containing the stored data for that report. For example, FIG. 8B shows an "S" type report. The "S" format (Sales Index) report includes a listing of the various games and the sales for each game by week. Total sales, average weekly sales for all games, and the index are reported. The index for a given game is a ratio of the sales that game divided by the average sales for all games. The data in the report may be arranged in order of index (as shown in FIG. 8B) or in order of the launch date of the games (using the tab 806). In some embodiments, individuals tables of the display include each of these arrangements. FIG. 8C shows another table of the display of FIG. 8B. The table of FIG. 8C includes weekly index data for one of the games, and a graph 802 comparing the weekly sales for the one game with the average weekly sales for all games, allowing the performance for that game to be considered in view of weekly and seasonal variations in consumption of game tickets generally. In some embodiments, the table includes a respective sheet similar to that of FIG. 8C for each respective game, as indicated by the tabs 804 in FIG. 8B.

Other report formats may provide additional data about the configuration and profitability of each game. For example, the "A" format (Attribute) report displays a table in which the various data are sorted by several parameters, with a separate text page and graphic page (sheet) corresponding to each sorting parameter. The sorting parameters may include games, themes, color, play style, payout, churn, chatter, low brag, high brag, high tier, top prize, and the like. The user can move between these pages by clicking tabs at the bottom of the sheet.

In some embodiments, the appearance of a spreadsheet program is simulated, for example, using outputs from the DBMS, without requiring incorporation of an actual spreadsheet program in the system. In embodiments that do not include a spreadsheet program, an option may be provided to export the table currently displayed (or tables with all or any subset of the current user's lottery data) to a file using a standard spreadsheet format, such as the ".XLS" format used by the Excel program from Microsoft Corporation.

Referring again to FIG. 8A, a plurality of buttons 808–810 are provided for adding reports of any of the available types (in this case, "C," "S," or "A" reports, respectively). In response to selection of any of these buttons 808–810, a corresponding dialog box window is displayed for entry of data to schedule a new report. For example, in scheduling a calendar sales report, the user need only enter the state, beginning and ending sales dates, a process-from date, the schedule (preferably selected from a plurality of predetermined schedule choices), and a description. The "process-from" date is the first date that the system starts to generate a given report. The scheduler will generate the same report on a regular basis (Daily, Weekly, Monthly, and so forth) based on the selection made by the user.

To add a Sales Index report or Attributes report, the user enters: number of sales weeks, process-from date, the schedule (preferably selected from a plurality of predetermined schedule choices, using, for example, a drop down box), and individual selections of games from all of the available games. Alternatively, the user can specify the state, "from" and "to" dates, price point, and relationship to the price point (e.g., greater than, equal to, less than, or the like). In the case of an Attribute report, in addition to the above parameters, a theme level is specified.

The methods described herein are equally well suited for use in other network communication systems. For example, the methods are also applicable to pages received and displayed using other interactive platforms, such as interactive television systems. Further, the method and system as described herein are by no means limited by the types of content described above and functionality provided to users.

A method and tool are described above, which allow a user to review the past performance of lottery tickets (e.g. scratch-off tickets or instant tickets). Based on the performance of these tickets, the user can make an informed decision as to what would be the best offering of a newer ticket in the market place. During any season or period of the year, the user can look at the performance of all tickets during the same period or season of the last year or the prior years. The user can review data from different parts of the country and then come up with a strategy for the best ticket that could be sold during any given time of the year.

The exemplary method and system allows the user to parse and sort the pieces of information which are available and understand the results of different strategies and perform retail analysis. After completing the analysis, the user can generate a plan for a future period (e.g., for the next 12 months). For example, the user might decide to offer a one dollar game in August and a two dollar game in September and so on, and define the timeline for each game, and calculate the total value or revenue forecast to be brought into the lottery business. The single system allows the user to analyze the past lottery performances and generate a strategy for what to offer in the future to maximize profits.

The present invention can be embodied in the form of methods and apparatus for practicing those methods. The present invention can also be embodied in the form of program code embodied in tangible media, such as floppy diskettes, CD-ROMs, DVD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A computer implemented method for processing lottery sales data, comprising the steps of:
   (a) causing display of a table on a computer, the table containing data representing lottery game attributes and lottery ticket sales for a plurality of lottery game types;
   (b) enabling a user of the computer to query the data in the table based on at least one criterion from a predetermined list of criteria; and
   (c) forecasting sales of a new lottery game based on results of the query.

2. The method of claim 1, wherein data in the table that do not satisfy the query are excluded from being used in the forecasting.

3. The method of claim 1, wherein the query includes multiple conditions.

4. The method of claim 1, further comprising automatically generating and graphically displaying a schedule for launch of the new lottery game.

5. The method of claim 4, wherein the schedule includes when the design of the ticket is to begin, when manufacturing should occur, when review and delivery should occur and the launch date.

6. The method of claim 1, further comprising:
   causing the computer to display a menu for configuring the new game, and
   configuring the new game using game attributes input into the menu by the user.

7. The method of claim 6, wherein the menu enables the user to select the game attributes from a plurality of predetermined attribute lists.

8. The method of claim 7, wherein the plurality of predetermined attribute lists include a respective list for each one of a game theme, game play style and game feature.

9. The method of claim 1, enabling the user to enter an attribute of a lottery game, wherein the forecasted sales are based on past performance of lottery games having the entered attribute.

10. The method of claim 9, wherein the menu allows the user to select one or more attributes from one of the predetermined lists.

11. The method of claim 1, wherein the data are stored in a second computer, and the first computer used by the user is connected to the second computer by way of the Internet.

12. A computer implemented method for processing lottery sales data, comprising the steps of:
   (a) causing display of a table on a computer, the table containing data representing lottery game attributes and lottery ticket sales for a plurality of lottery game types;

(b) enabling a user of the computer to query the data in the table based on at least one criterion from a predetermined list of criteria; and (c) modifying the table to contain values of an index that compares performance of each of the lottery game types that satisfy the query.

13. The method of claim 12, wherein only data corresponding to a subset of the lottery game types that satisfy the query are included in the modified table.

14. The method of claim 13, further comprising:

receiving a modification to the query input by the user;

dynamically updating the index values, so that the index values compare performance of each of the lottery game types that satisfy the modified query.

15. The method of claim 12, wherein the data are stored in a second computer, and the first computer used by the user is connected to the second computer by way of the Internet.

16. A computer implemented method for processing lottery sales data, comprising the steps of:

(a) causing display of a table on a computer, the table containing data representing lottery game attributes and lottery ticket sales for a plurality of lottery game types;

(b) causing the computer to display a menu for configuring a new lottery game, (c) configuring the new lottery game using game attributes input into the menu by the user; and (d) automatically generating and graphically displaying a schedule for development and launch of the new lottery game.

17. The method of claim 16, wherein the menu enables the user to select the game attributes from a plurality of predetermined attribute lists.

18. The method of claim 17, wherein the plurality of predetermined attribute lists include a respective list for each one of a game theme, game play style and game feature.

19. The method of claim 16, wherein the schedule includes when the design of the ticket is to begin, when manufacturing should occur, when review and delivery should occur and the launch date.

20. The method of claim 19, wherein step (d) includes allocating predetermined periods of time for the design of the ticket, manufacturing, review and delivery.

21. The method of claim 16, wherein the data are stored in a second computer, and the first computer used by the user is connected to the second computer by way of the Internet.

22. A computer readable medium encoded with computer program code, wherein, when the computer program code is executed by a processor, the processor performs a computer implemented method for processing lottery sales data, comprising the steps of:

(a) causing display of a table on a computer, the table containing data representing lottery game attributes and lottery ticket sales for a plurality of lottery game types;

(b) enabling a user of the computer to query the data in the table based on at least one criterion from a predetermined list of criteria; and (c) forecasting sales of a new lottery game based on results of the query.

23. The computer readable medium of claim 22, wherein data in the table that do not satisfy the query are excluded from being used in the forecasting.

24. The computer readable medium of claim 22, wherein the query includes multiple conditions.

25. The computer readable medium of claim 22, further comprising automatically generating and graphically displaying a schedule for launch of the new lottery game.

26. The computer readable medium of claim 25, wherein the schedule includes when the design of the ticket is to begin, when manufacturing should occur, when review and delivery should occur and the launch date.

27. The computer readable medium of claim 22, further comprising:

causing the computer to display a menu for configuring the new lottery game, and configuring the new lottery game using game attributes input into the menu by the user.

28. The computer readable medium of claim 27, wherein the menu enables the user to select the game attributes from a plurality of predetermined attribute lists.

29. The computer readable medium of claim 28, wherein the plurality of predetermined attribute lists include a respective list for each one of a game theme, game play style and game feature.

30. A computer readable medium encoded with computer program code, wherein, when the computer program code is executed by a processor, the processor performs a computer implemented method for processing lottery sales data, comprising the steps of:

(a) causing display of a table on a computer, the table containing data representing lottery game attributes and lottery ticket sales for a plurality of lottery game types;

(b) enabling a user of the computer to query the data in the table based on at least one criterion from a predetermined list of criteria; and (c) modifying the table to contain values of an index that compares performance of each of the lottery game types that satisfy the query.

31. The computer readable medium of claim 30, wherein only data corresponding to a subset of the lottery game types that satisfy the query are included in the modified table.

32. The computer readable medium of claim 30, further comprising:

receiving a modification to the query input by the user;

dynamically updating the index values, so that the index values compare performance of each of the lottery game types that satisfy the modified query.

33. A computer readable medium encoded with computer program code, wherein, when the computer program code is executed by a processor, the processor performs a computer implemented method for processing lottery sales data, comprising the steps of:

(a) causing display of a table on a computer, the table containing data representing lottery game attributes and lottery ticket sales for a plurality of lottery game types;

(b) causing the computer to display a menu for configuring a new lottery game, (c) configuring the new lottery game using game attributes input into the menu by the user; and (d) automatically generating and graphically displaying a schedule for development and launch of the new lottery game.

34. The computer readable medium of claim 33, wherein the menu enables the user to select the game attributes from a plurality of predetermined attribute lists.

35. The computer readable medium of claim 33, wherein the schedule includes when the design of the ticket is to begin, when manufacturing should occur, when review and delivery should occur and the launch date.

36. The computer readable medium of claim 35, wherein step (d) includes allocating predetermined periods of time for the design of the ticket, manufacturing, review and delivery.

37. A computer implemented system for processing lottery sales data, comprising:
- means for causing display of a table on a computer, the table containing data representing lottery game attributes and lottery ticket sales for a plurality of lottery game types;
- means for enabling a user of the computer to query the data in the table based on at least one criterion from a predetermined list of criteria; and
- means for forecasting sales of a new lottery game based on results of the query.

38. A computer implemented system for processing lottery sales data, comprising:
- means for causing display of a table on a computer, the table containing data representing lottery game attributes and lottery ticket sales for a plurality of lottery game types;
- means for enabling a user of the computer to query the data in the table based on at least one criterion from a predetermined list of criteria; and
- means for modifying the table to contain values of an index that compares performance of each of the lottery game types that satisfy the query.

39. A computer implemented system for processing lottery sales data, comprising:
- means for causing display of a table on a computer, the table containing data representing lottery game attributes and lottery ticket sales for a plurality of lottery game types;
- means for causing the computer to display a menu for configuring a new lottery game,
- means for configuring the new lottery game using game attributes input into the menu by the user; and
- means for automatically generating and graphically displaying a schedule for development and launch of the new lottery game.

* * * * *